US007530895B2

(12) United States Patent
Kigoshi

(10) Patent No.: US 7,530,895 B2
(45) Date of Patent: May 12, 2009

(54) METHOD FOR ADVANCING NETWORK GAME BY GROUP COMPETITION

(75) Inventor: Yusuke Kigoshi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 547 days.

(21) Appl. No.: 10/322,604

(22) Filed: Dec. 19, 2002

(65) Prior Publication Data

US 2003/0216184 A1 Nov. 20, 2003

(30) Foreign Application Priority Data

May 14, 2002 (JP) .......................... P2002-138361

(51) Int. Cl.
*A63F 13/00* (2006.01)
*A63F 9/24* (2006.01)

(52) U.S. Cl. .................. 463/23; 463/1; 463/8; 463/31; 463/42; 463/43

(58) Field of Classification Search ..................... 463/9, 463/29, 40–43, 1, 7, 23; 709/223–225; 700/91–93, 700/14
See application file for complete search history.

(56) References Cited

U.S. PATENT DOCUMENTS

| 5,083,271 | A | * | 1/1992 | Thacher et al. | 700/92 |
| 5,359,510 | A | * | 10/1994 | Sabaliauskas | 700/91 |
| 5,846,132 | A | * | 12/1998 | Junkin | 463/42 |
| 5,917,725 | A | * | 6/1999 | Thacher et al. | 700/91 |
| 6,699,124 | B2 | * | 3/2004 | Suchocki | 463/42 |
| 6,746,332 | B1 | * | 6/2004 | Ing et al. | 463/42 |
| 6,749,513 | B2 | * | 6/2004 | Park | 463/42 |
| 6,758,746 | B1 | * | 7/2004 | Hunter et al. | 463/9 |
| 6,761,631 | B2 | * | 7/2004 | Lydon et al. | 463/9 |
| 6,767,284 | B1 | * | 7/2004 | Koza | 463/29 |
| 6,767,287 | B1 | * | 7/2004 | Mcquaid et al. | 463/42 |
| 2002/0119824 | A1 | * | 8/2002 | Allen | 463/42 |
| 2003/0144058 | A1 | * | 7/2003 | Park | 463/42 |

FOREIGN PATENT DOCUMENTS

| JP | 9-164272 | 6/1997 |
| JP | 2000-51524 | 2/2000 |
| JP | 2001-340646 | 12/2001 |

(Continued)

OTHER PUBLICATIONS

Farkas, Diablo II:Ultimate strategy Guide;2001;Brady Publishing;p. 20;22-23; 126-134; 232-233; 220-223.*

(Continued)

*Primary Examiner*—John M Hotaling, II
*Assistant Examiner*—Ryan Hsu
(74) *Attorney, Agent, or Firm*—Greenblum & Bernstein, P.L.C.

(57) ABSTRACT

A world map includes multiple regions. Each region includes one or multiple areas. A player causes his/her player character to belong to any nation. As a task given to the player character, a battle with an enemy character is provided on the map of each area (the battle may be waged by a party). When the, player character wins the battle in each area, predetermined points are given to a home nation of the player character participating in the battle. The points given to each home nation are totaled for each region, and a nation that dominates each region is decided according to a result of the total points.

18 Claims, 17 Drawing Sheets

FOREIGN PATENT DOCUMENTS

JP    2002-126343    5/2002

OTHER PUBLICATIONS

Desslock, www.gamespot.com, search on "Diablo II" review; Sections labeled "Review" and "Screenshots".*
Kasavin, Greg; www.gamespot.com, search on "Command & Conquer: Red Alert 2"; Sections labeled "Review" and "Screenshots".*
Hasbro Games; "Risk: The Game of Global Domination"; 1999; Parker Brothers; p. 1-15.*
Milton Bradley, "Axis & Allies" Game Play Manual, Milton-Bradley, 1984, see entire document.*
Meyer/Glass Interactive, LLC, "Axis & Allies Game Play Manual", Hasbro Interactive, Inc. 1998, see entire document.*
"Weekly Famitsu", Enterbrain Inc., Jan. 18, 2002, vol. 17, No. 3, pp. 26-27, together with an English language translation of the marked portion.
"Weekly Famitsu", Enterbrain Inc., Feb. 8, 2002, vol. 17, No. 6, p. 126, together with an English language translation of the marked portion.
"Weekly Famitsu Extra Number—Famitsu Net Games", Enterbrain Inc., May 3, 2002, extra number, p. 23, together with an English language translation of the marked portion.
"Famitsu PS2", Enterbrain Inc., Jan. 25, 2002, vol. 7, No. 1, pp. 16-17, together with an English language translation of the marked portion.
"Monthly Dengeki-Oh", Media Works Co., Ltd., Mar. 1, 2002, vol. 10, No. 3, p. 95, together with an English language translation of the marked portion.
"Monthly Dengeki-Oh", Media Works Co., Ltd., Jun. 1, 2002, vol. 10, No. 7, p. 17, together with an English language translation of the marked portion.
"Dengeki PlayStation", Media Works Co., Ltd., Jan. 11, 2002, vol. 8, No. 2, p. 93, together with an English language translation of the marked portion.
"Dengeki PlayStation", Media Works Co., Ltd., Apr. 19, 2002, vol. 8, No. 7, p. 19, together with an English language translation of the marked portion.
"Weekly the PlayStation2", Softbank Publishing Inc., Jan. 18, 2002, vol. 8, No. 2, pp. 34-35, together with an English language translation of the marked portion.
"Weekly the PlayStation2", Softbank Publishing Inc., Jan. 25, 2002, vol. 8, No. 3, p. 25, together with an English language translation of the marked portion.
"Weekly the PlayStation2", Softbank Publishing Inc., Mar. 15, 2002, vol. 8, No. 9, p. 30, together with an English language translation of the marked portion.
"Weekly the PlayStation2", Softbank Publishing Inc., May 24, 2002, vol. 8, No. 18, p. 96, together with an English language translation of the marked portion.
"Dorimaga", Softbank Publishing Inc., Jan. 25, 2002, vol. 19, No. 1, p. 89, together with an English language translation of the marked portion.
"Dorimaga", Softbank Publishing Inc., Feb. 8, 2002, vol. 19, No. 2, p. 135, together with an English language translation of the marked portion.
"Hyper PlayStation2", Sony Magazines Inc., Feb. 1, 2002, vol. 8, No. 2, p. 64, together with an English language translation of the marked portion.
"Hyper PlayStation2", Sony Magazines Inc., Mar. 1, 2002, vol. 8, No. 3, p. 17, together with an English language translation of the marked portion.
Hyper PlayStation2, Sony Magazines Inc., Apr. 1, 2002, vol. 8, No. 4, p. 81, together with an English language translation of the marked portion.
"Online Player", Mainichi Communications Inc., Jun. 8, 2002, vol. 9, No. 12, p. 45, together with an English language translation of the marked portion.
"Tech Win", Ascii Corporation, Mar. 1, 2002, vol. 8, No. 3, p. 53, together with an English language translation of the marked portion.
A website located at <http://www.playonline.com/ff11/world/401.html>, downloaded on May 9, 2002, together with an English language translation.
A website located at <http://www.playonline.com/ff11/home/news.html>, downloaded on Apr. 25, 2002, together with an English language translation.
A website located at <http://www.playonline.com/ff11/home/news.html>, downloaded on May 9, 2002, together with an English language translation.
English Language Abstract of JP 9-164272.
English Language Abstract of JP 2002-126343.
English Language Abstract of JP 2000-51524.
"Command & Conquer: Red Alert 2, Game Info" [Online], URL: http://www.ea.com/official/cc/redalert2/english/features.jsp, downloaded from the Internet on Mar. 11, 2008.
"Command & Conquer: Red Alert 2, Game Guide," [Online], URL: http://www.gamespot.com/gamespot/guides/pc/red_alert_2/p8_01.html, downloaded from the Internet on Mar. 12, 2008.
"Command & Conquer: Red Alert 2—Wikipedia, the free encyclopedia," [Online], URL: http://en.wikipedia.org/wiki/RA2, downloaded from the Internet on Mar. 12, 2008.
"Expert Level help required!—p. 2—DeeZire Online," [Online], URL: http://www.deezire.net/forums/red-alert-2-yuris-revenge-editing/437-expert-level-help-required-2.html, downloaded from the Internet on Mar. 12, 2008.

\* cited by examiner

FIG.7

| | | MAXIMUM LEVEL OF PC IN PARTY | | | | |
|---|---|---|---|---|---|---|
| | | 1~10 | 11~20 | 21~30 | 31~40 | 41~50 |
| DIFFERENCE IN LEVEL BETWEEN EC AND PC | +5 | 300 | 300 | 300 | 300 | 300 |
| | +4 | 200 | 200 | 200 | 200 | 200 |
| | +3 | 160 | 160 | 160 | 160 | 160 |
| | +2 | 140 | 140 | 140 | 140 | 140 |
| | +1 | 120 | 120 | 120 | 120 | 120 |
| | ±0 | 100 | 100 | 100 | 100 | 100 |
| | −1 | 72 | 72 | 72 | 72 | 72 |
| | −2 | 50 | 50 | 50 | 50 | 61 |
| | −3 | 36 | 36 | 43 | 43 | 50 |
| | −4 | 25 | 25 | 36 | 36 | 43 |

430

PC : PLAYER CHARACTER
EC : ENEMY CHARACTER

METHOD FOR ADVANCING NETWORK GAME BY GROUP COMPETITION

CROSS REFERENCE TO RELATED APPLICATION

The present disclosure relates to subject matter contained in Japanese Patent Application No. 2002-138361, filed on May 14, 2002, the disclosure of which is expressly incorporated herein by reference in its entirety.

BACKGROUND OF THE INVENTION

1. Field of the Invention

The present invention relates to network video games. More particularly, the present invention relates to a technique for adding a change in a content of a game to improve communication among players by group competition in a network game in which multiple players participate and advance the game.

2. Description of the Related Art

A network game is a game in which multiple players participate and advance the game. The player characters of the respective players move on a common map and develop the game. On the map, various tasks such as battles with enemy characters (monster characters subjected to system control) are provided. The player characters solve these tasks to advance the game.

In the network game, multiple characters join one another in a party, and the player characters belonging to the same party can solve the tasks in cooperation with one another. This is one of the features in which the network game is different from a standalone video game. In the network game, the player characters join one another and solve the problems, thereby improving communication among players.

However, in the conventional network game, though the player characters of the respective players share the same world, the world is changed by an action of a certain player character or, at the most, actions of the other player characters that are the members of the party. Since the game advances by the independent action of each player character even in the network game, the network game is substantially the same as the standalone video game. For this reason, the conventional network game has a problem in that the players feel bored in the game as the playing time goes by.

In the conventional network game, since the action of each player character is substantially independent, many players cannot advance the game with a common sense of purpose. Thus, in the conventional network game, there is no change in the content inherent in the network game.

SUMMARY OF THE INVENTION

An object of the present invention is to provide a network game system that adds a chance in the content of the network game and that performs communication among players smoothly, thereby preventing the game from becoming monotonous even over a long playing time.

In order to attain the above object, a network game system according to a first aspect of the present invention has a server apparatus and multiple client apparatuses each connected to the server apparatus via a network. Each of the client apparatuses includes a group selector that selects a group to which a player character operated in a virtual space based on a player's operation belongs. Each client apparatus further includes a group information transmitter that transmits group information on the group selected by the group selector to the server apparatus via the network. Each client apparatus further includes an operation instructing device that instructs an operation of the player character in the virtual space based on a player's operation. Each client apparatus further includes an operation transmitter that transits the operation instructed by the operation instructing device to the server apparatus via the network. Each client apparatus further includes a change information receiver that receives change information indicating a change in a content of a game sent from the server apparatus. Each client apparatus further includes a display controller that causes a display device to display the content of the game indicated by the received change information.

The server apparatus includes a group information receiver that receives the group information transmitted from the group information transmitter. The server apparatus further includes a group register that registers groups to which each player character of the client apparatuses belongs based on the group information received by the group information receiver. The server apparatus further includes an operation receiver that receives the operation of the player character transmitted from the operation transmitter. The server apparatus further includes a point calculator that calculates points corresponding to the degree of achievement of a task of each player character based on the received operation of the player character. The server apparatus further includes a point totaler that totals the points calculated by the point calculator for each group to which each player character belongs. The server apparatus further includes a game changer that changes the content of the game based on the total points for each group. The server apparatus further includes a change information transmitter that transmits change information on the content of the game changed by the game changer to each of client apparatuses via the network.

In the network game system, the player character operating in the virtual space belongs to any one of the groups by the player's selection. The points calculated when each player character achieves the task are totaled for each group to which the player character belongs. The content of the game is changed in accordance with the total points for each group. The content of the game is changed by not only the operation of the player character for each player but also the operation of the player characters for other players. For this reason, the player can feel the change in the content of the game, and the player does not feel the progress of the game is monotonous even if the game is played for a long time.

Since the content of the game is changed according to the total points for each group to which the player character belongs, each play can have a high sense of belonging to the group selected by the player himself/herself. The high sense of loyalty to the group results in a motivation for each player to perform communication with the other player (particularly, a person who belongs to the same group). This makes it smooth to perform communication between the players and to prevent the progress of the game from being monotonous. A hostile atmosphere, such as a battle between the player characters, likely will not occur. Of course, it does not prevent the player characters that belong to different groups from joining one another to advance the game.

In order to attain the above object, a game server apparatus according to a second aspect of the present invention is connected to multiple client apparatuses via a network. The game server apparatus includes a group register that registers groups to which each of player characters of the client apparatuses belongs.

The game server apparatus further includes a point calculator that calculates points corresponding to a degree of achievement of a task given to each player character operated in a virtual space according to a player's operation at one of the client apparatuses. The game server apparatus further includes a point totaler that totals the points calculated by the point calculator for each group to which each player character belongs. The game server apparatus further includes a game changer that changes a content of a game based on the total points for each group. The game server apparatus further includes a change information transmitter that transmits change information on the content of the game changed by the game changer to each of the client apparatuses via the network.

In order to attain the above object, a game server apparatus according to a third aspect of the present invention is connected to multiple client apparatuses via a network. The game server apparatus includes a memory that stores a network program. The game server apparatus further includes a processor that executes the network game program. The game server apparatus further includes a communications apparatus that performs communications with the client apparatuses. The network, game program stored in the memory causes the processor to execute preregistering, in the server apparatus, a group to which a player character selected according to a player's operation at one of the client apparatuses belongs. The network game program causes the processor to further calculates points according to a degree of achievement of a task given to each player character operated in a virtual space according to the player's operation at one of the client apparatuses. The network game program causes the processor to further total the calculated points for each group to which each player character belongs so as to change a content of a game based on the total points for each group. The network game program causes the processor to further transmit change information on the changed content of the game to each of the client apparatuses via the network.

In the game server apparatus according to the third aspect, the network game program stored in the memory can be provided as being recorded on a computer-readable storage medium. This computer-readable storage medium may be a storage medium, which is structured to be attachable and detachable to and from the computer apparatus and can be provided separately from the computer apparatus. This computer-readable storage medium may be a storage medium such as a fixed disk apparatus, which is provided in the computer apparatus and provided together with the computer apparatus. The network game program stored in the memory in the game server apparatus according to the third aspect can be distributed via a network from another server apparatus existing on the network after superimposing the data signal of the program on a carrier wave.

In order to attain the above object, a network game advancing method according to a fourth aspect of the present invention is executed by a system in which a server apparatus and multiple client apparatus are connected to each other via a network. The method includes preregistering, in the server apparatus, a group to which a player character selected according to a player's operation at one of the client apparatuses belongs. The method further includes calculating points corresponding to a degree of achievement of a task given to each player character operated in a virtual space according to the player's operation at one of the client apparatus. The method further includes totaling the calculated points for each group to which each player character belongs. The method further includes changing a content of a game based on the total points for each group.

In the inventions according to the first to fourth aspects, the client apparatuses connected to the game server apparatus can be a general-purpose computer such a personal computer, etc., in addition to a video game dedicated apparatus. The client apparatuses may be other electronic equipment capable of operating as a computer apparatus such as a cellular phone, etc. Moreover, the client apparatuses may be a portable or stationary.

BRIEF DESCRIPTION OF THE DRAWINGS

FIG. 7 is a view illustrating an example of an experience value calculation table provided in the game server apparatus according to an embodiment of the present invention;

DETAILED DESCRIPTION OF PREFERRED EMBODIMENTS

Embodiments of the present invention will be specifically described with reference to the drawings.

Figure 1:
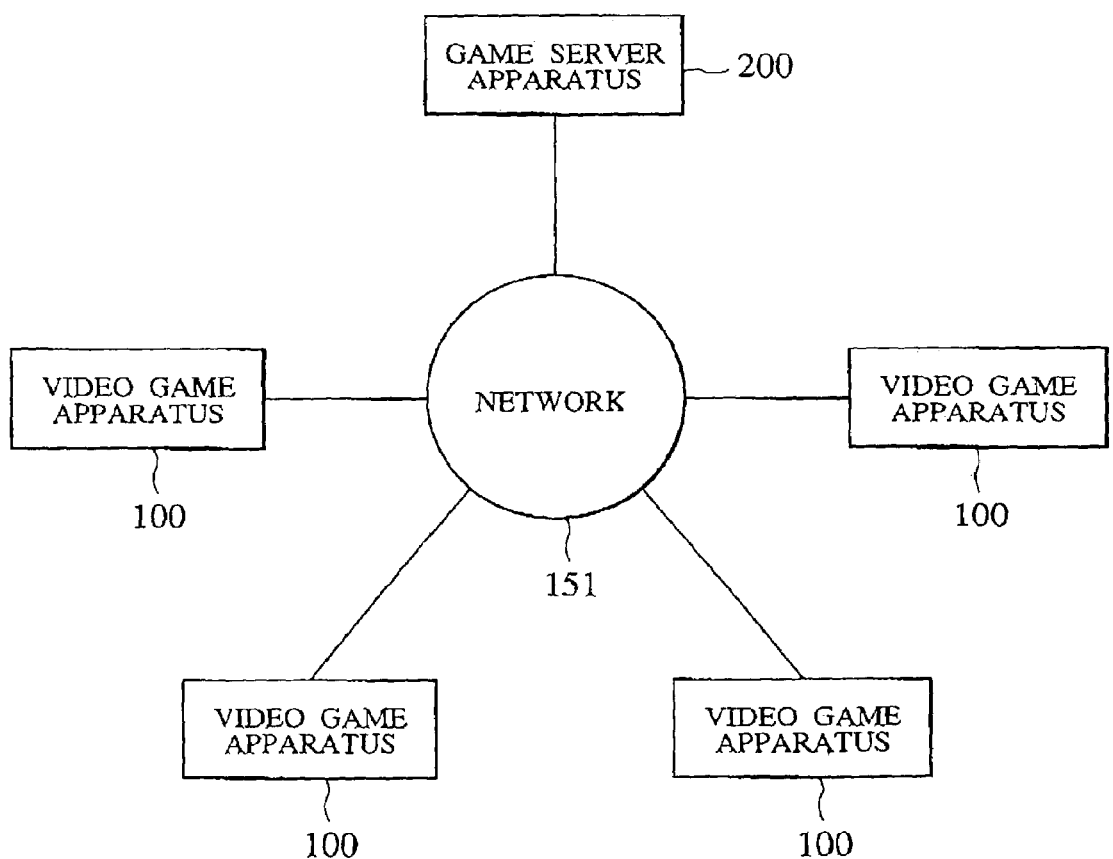
FIG. 1 is a block diagram showing a structure of a network game system according to an embodiment of the present invention.

FIG. 1 is a block diagram showing a structure of a network game system according to an embodiment of the present invention. As illustrated in the figure, this network game system is composed of multiple video game apparatuses 100 (four apparatuses here) and a game server apparatus 200. Each of the video game apparatuses 100 is connected to the game server apparatus 200 via a network 151.

Each player, who participates in the network game that this system provides, selects a nation to which his/her player character belongs in advance. In the progress of the game, there is a case that a single player or a party of two or more player characters battles with an enemy character. An experience value is given to each player character that participated in a victorious battle and points corresponding to an experience value are given to the nation to which each player character belongs. Points are totaled on a nation-by-nation basis. Then, superiority or inferiority of the nation is decided based on the total points, and this changes the content of the game.

Figure 2:
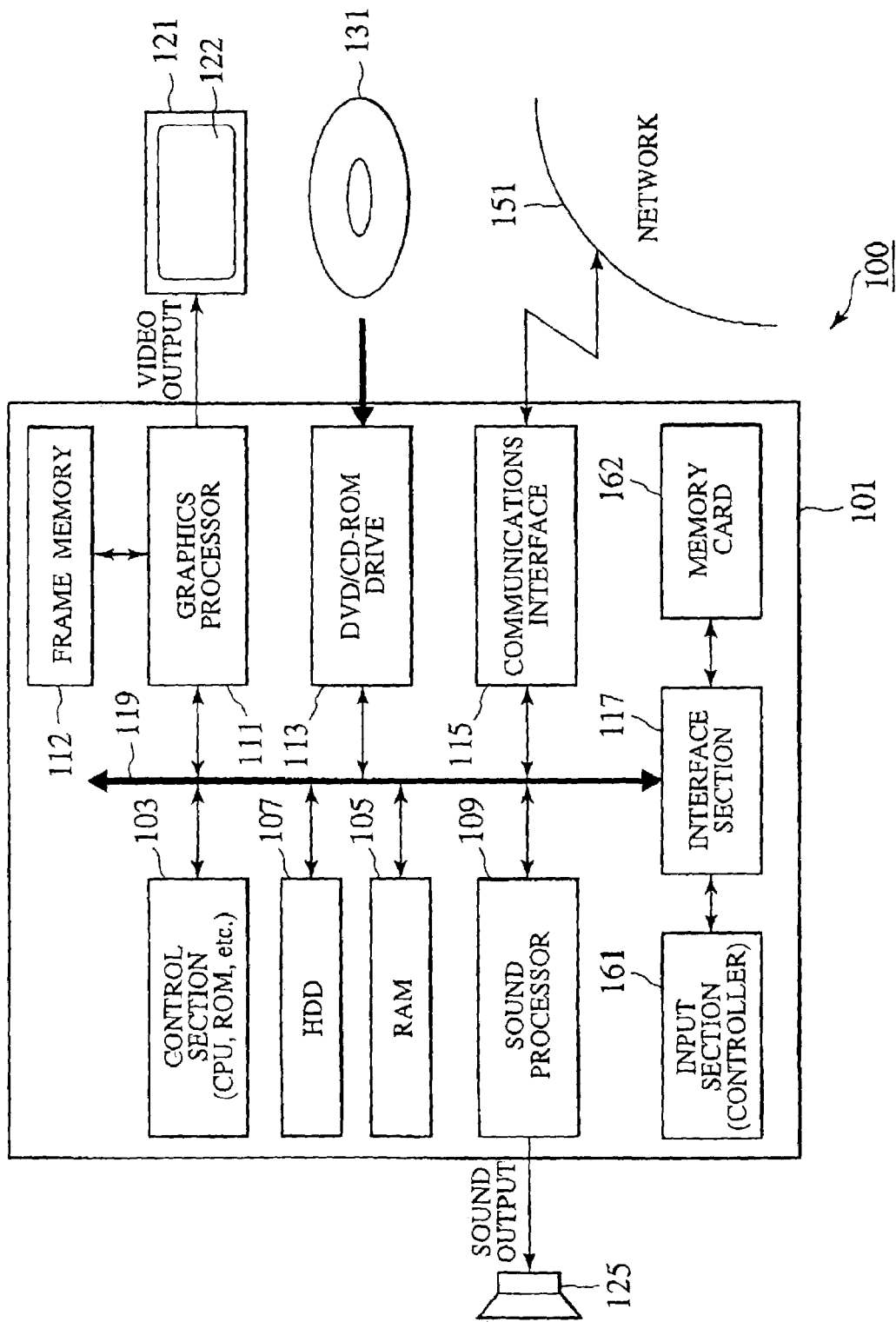
FIG. 2 is a block diagram showing a structure of a video game apparatus according to an embodiment of the present invention.

FIG. 2 is a block diagram showing a structure of the video game apparatus 100 of FIG. 1. As illustrated in the figure, the video game apparatus 100 is constructed to have a video game machine main body 101. The video game machine main body 101 includes a control section 103 connected to its internal bus 119, a RAM (Random Access Memory) 105, a hard disk drive (HDD) 107, a sound processor 109, a graphics processor 111, a DVD/CD-ROM drive 113, a communications interface 115, and an interface section 117.

The sound processor 109 of the video game machine main body 101 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network 151. An input section (control section) 161 and a memory card 162 are connected to the interface section 117. A keyboard (not shown) as the input section 161 may be connected to the interface section 117.

The control section 103 includes a CPU (Central Processing Unit), a ROM (Read Only Memory), etc., and executes a program stored on the HDD 107 or the storage medium 131, and controls the video game apparatus 100. The control section 103 has an internal timer. The RAM 105 is a work area for the control section 103. The HDD 107 is a storage area for storing a program and data. In the case where a program executed by the control section 103 instructs the sound processor 109 to perform a sound output, the sound processor 109 interprets the instruction and outputs a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame time of the image included in the outputting video signal is, for example, 1/30 sec. The DVD/CD-ROM drive 113 performs writing/reading of the program and data to/from the storage medium 131. The communications interface 115 is connected to the network 151 to perform communications with other computers such as a server apparatus 200.

The interface section 117 outputs input data sent from the input section 161 to the RAM 105, and the control section 103 interprets it to carry out arithmetic processing. The input section 161 includes directional keys (four directions of up and down and right and left) and multiple operation buttons (four buttons of circle, square, triangle and cross), moves a character (to be described later) by the operation of the directional key, and performs a predetermined processing by the operations of the operation buttons. The directional keys are used to move a cursor and scroll a screen. The operation buttons are used to input an instruction from the player. Moreover, the interface section 117 forwards data, indicative of the progress of the game stored in the RAM 105, to the memory card 162 based on the instruction from the control section 103. The interface section 117 reads data of the game stored in the memory card 162 at the time of stopping the game, and transfers read data to the RAM 105.

The program and data for performing the network game by the video game, apparatus 100 are first stored to, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored to the RAM 105 while the control section 103 performs processing.

In connection with the video game apparatuses 100, any general-purpose personal computer may be used as the video game machine main body 101 if similar structural components are provided. A cellular phone having the same functions as that of the video game machine main body 101 may be used. A portable video game player, which contains the display device 121 and the sound output device 125 in the same cabinet as that of the video game machine main body 101, may also be used.

In the case where the video game machine main body 101 is a portable video game player, a semiconductor memory card may be used as the storage medium 131 in place of a DVD-ROM or CD-ROM. A card slot for inserting the memory card may be formed in place of the DVD/CD-ROM drive 113. In the case where the video game machine main body 101 is a general-purpose personal computer, the program and data relating to the present invention may be pre-stored to the HDD 107 instead of being stored in the storage medium 131. Regarding the storage medium for storing the program and data relating to the present invention, any kid of storage medium may be used according to the physical form of hardware and the distribution thereof.

Figure 3:
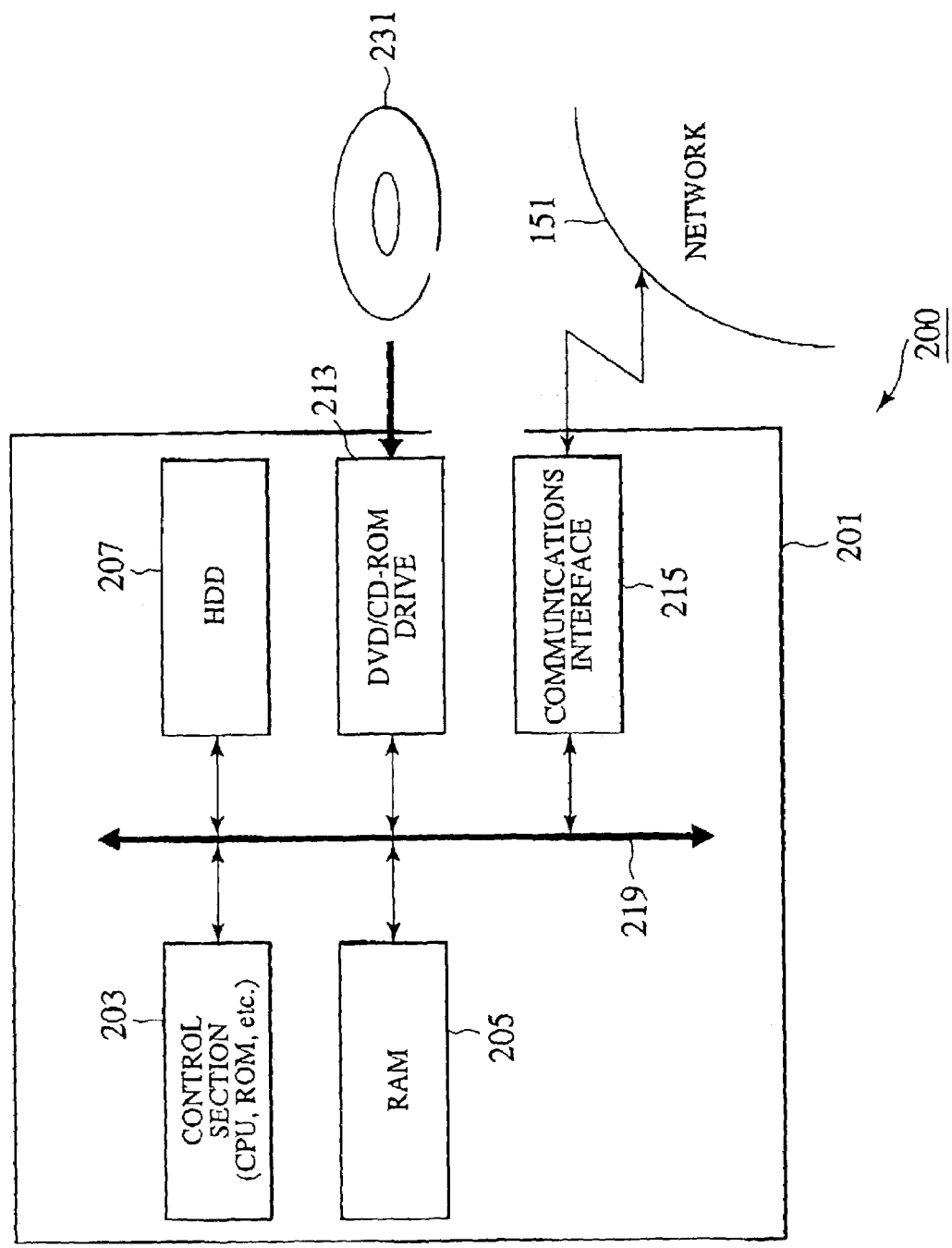
FIG. 3 is a block diagram showing a structure of a game server apparatus according to an embodiment of the present invention.

FIG. 3 is a block diagram showing the structure of the game server apparatus 200 of FIG. 1. As illustrated in the figure, the game server apparatus 200 is constructed to have a game server main body 201. The game server main body 201 includes a control section 203 connected to its internal bus 219, a RAM 205, a hard disk drive (HDD) 207, a DVD/CD-ROM drive 213, and a communications interface 215. A storage medium (DVD-ROM or CD-ROM) 231 can be attached to the DVD/CD-ROM drive 213.

The control section 203 includes a CPU (Central Processing Unit), a ROM (Read Only Memory), etc., and executes a program stored on the HDD 207 or the storage medium 231, and controls the game server apparatus 200. The RAM 205 is a work area for the control section 203. The HDD 207 is a storage area for storing a program and data. The communications interface 215 is connected to the network 151 and performs communications with the video game apparatuses 100.

The program and data for performing the network game by the game server 200 are first stored to, for example, the storage medium 231 The program and data are read by the DVD/CD-ROM drive 213 and loaded onto the RAM 205 at the time of execution. The control section 203 processes the program and data loaded onto the RAM 205, and advances the network game based on the messages sent from the video game apparatuses 100. Intermediate data is stored to the RAM 205 while the control section 203 performs processing.

The following will explain a world map that defines a range where the player characters are movable according to the players' operation in the network game according to an embodiment of the present invention.

Figure 4:
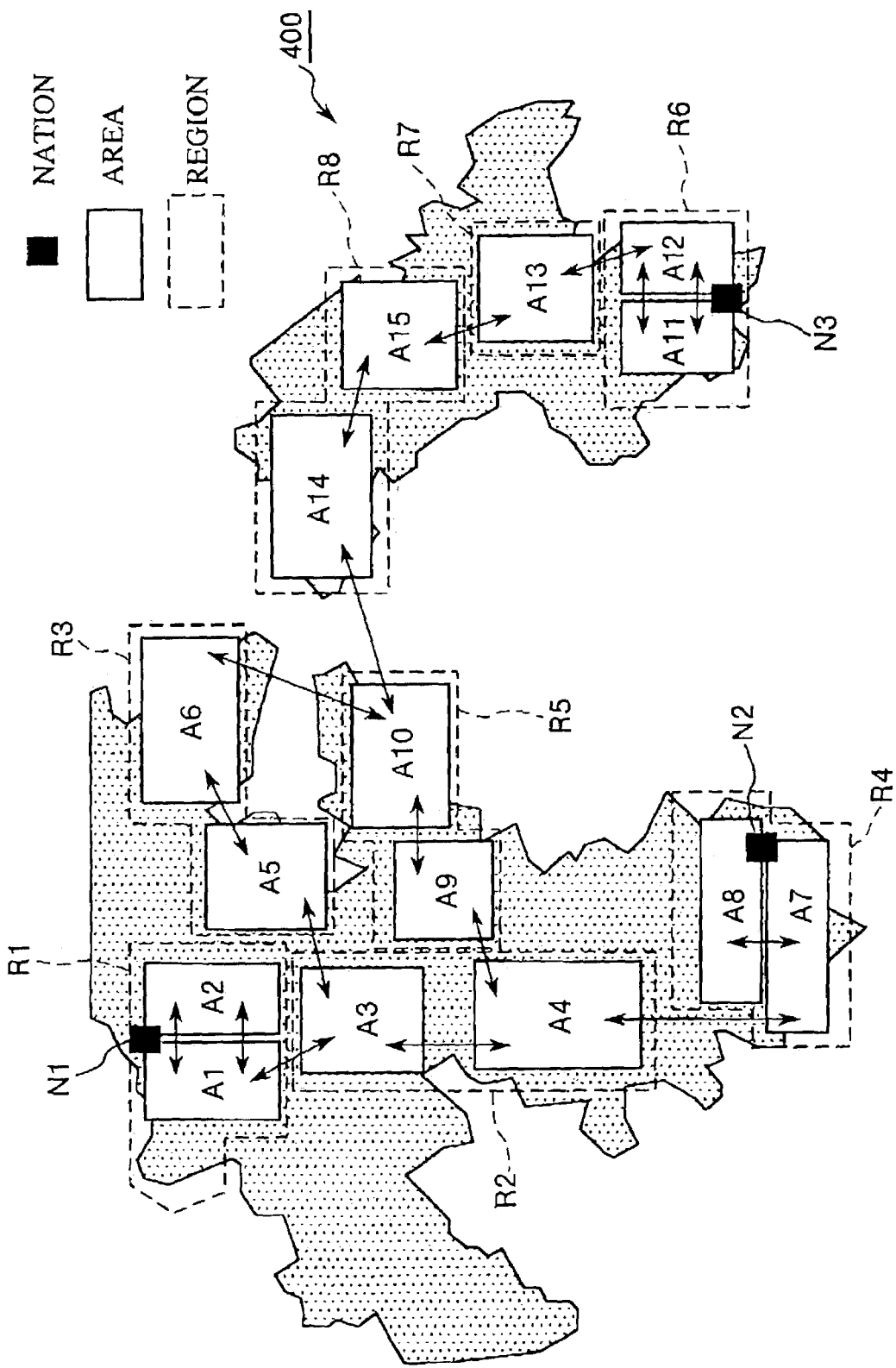
FIG. 4 is a view illustrating a world map for a network game according to an embodiment of the present invention provides.

FIG. 4 is a view showing a world map that is applied to this network game. A world map 400 is a virtual space where the player characters operate, and includes nations N1 to N3 and areas A1 to A15. Nations N1 to N3 can be considered as special areas. Each player character belongs to one of these nations. Each player starts the game at one of the nations N1 to N3 to which the corresponding player character belongs and advances the game.

The world map 400 includes regions R1 to R8. Each of regions R1 to R8 includes one or two of areas A1 to A15. The regions R1 to R8, dominion is set to either one of the nations N1 to N3, or monsters, by conquest decision processing to be described later. In addition, there is a mutual state where dominion is set to neither the nations N1 to N3 nor the monsters. In the case of a nation that dominates four or more of the regions R1 to R8, the corresponding nation becomes the superior nation in the world of the game.

Area maps axe also provided to correspond to areas A1 to A15 and nations N1 to N3 on the world map 400. If the player character enters any one of the areas A1 to A15 and any one of nations N1 to N3, the player character moves on the area map. If the player character goes out of the area map, the player character moves on the world map 400 again. The player character can freely come and go between the world map 400 and the area maps of the nations N1 to N3 or the area maps of the areas A1 to A15.

The player character may simply jump between the areas without moving on the world map 400. In this case, the world map 400 can be used as a schematic view that makes it possible for the player to easily understand the layout of the virtual space. Item shops and non-player characters that exist on the area maps of areas A1 to A15 and those of nations N1 to N3 are changed by setting dominant nation information to be described later.

At the item shops existing on the area maps of nations N1 to N3, the player character that belongs to any nation can purchase items. A player character that belongs to the nation where the item shop exists can purchase many kinds of items and lower-price items according to the settings of the dominant nation and superior nation. Though the player character that belongs to the nation where the item shop exists can purchase the items under advantageous conditions over player characters that belong to another nation, the degree of advantage is changed depending on the dominant circumstances of regions R1 to R8 by the corresponding nation. A case may be, of course; considered where the player characters that belong to other nations can purchase the items under the same condition as the player character that belongs to the nation where the item shop exists.

At the item shops existing on the area maps of nations N1 to N3, each of the nations N1 to N3 dominates one of the regions R1 to R8, and the player character belonging to the dominating nation can thereby purchase special items (staples) related to the dominated region. Thus, if there is a change in the item shop on the area map of any of the nations, the player character that belongs to the corresponding nation can obtain the items easily as compared with the item shops existing on the area maps of the other nations.

At the item shops existing on the area maps of the areas A1 to A15, only the player character belonging to the nation, which dominates the region R1 to R8 including the corresponding area, can purchase the items. As a matter of course, the player character that belongs to the dominant nation can also purchase the staples of the corresponding area. The player character belonging to the nation that dominates many areas can purchase the items more easily since the number of locations where the items can be purchased is increased.

Data of the world map 400 and area maps (including item shops and non-player characters) is stored in the storage medium 131. Data of item shops and non-player characters includes both data obtained before and after a change is added thereto by setting dominant nation information. Information on the position where the player character exists on the world map 400, or the area map is always sent to the game server apparatus 200 from the video game apparatus 100.

An explanation is next given of various kinds of tables provided in the game server apparatus 200 and various kinds of data stored in the game server apparatus 200 in the network game according to an embodiment.

Figure 5:
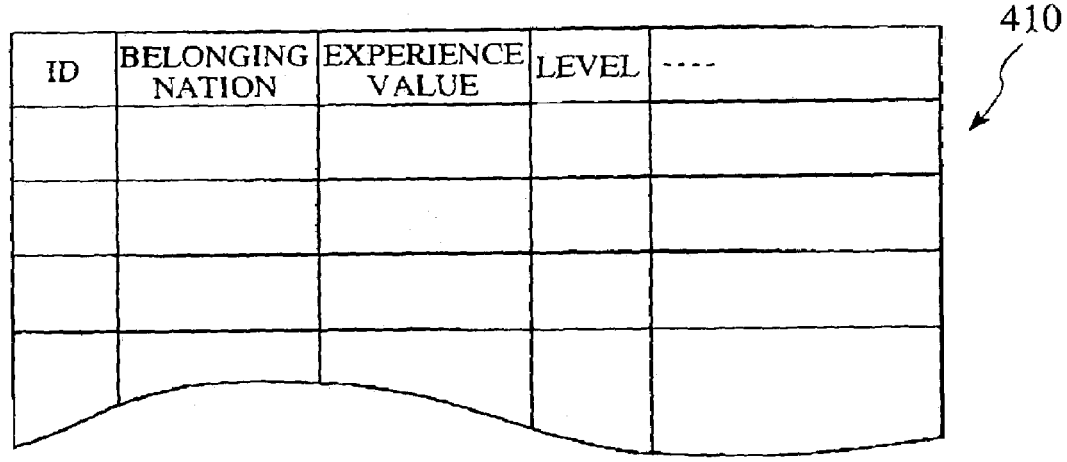
FIG. 5 is a view illustrating an example of a player character table provided in the game server apparatus according to an embodiment of the present invention.

FIG. 5 is a view showing a player character table provided in the RAM 205 of the game server apparatus 200. A player character table 410 is a table that registers information on the player character for each player. Each record of the player character table 410 includes a log-in ID of each player a home nation of the player character selected by the player, an experience value obtained by the player character, and a level of the player character based on the experience value. The level affects offensive power and defense power in battle. Each record of the player character table 410 also includes a current position of each player-character, a player's attribute except the experience value and the level, and information (not shown) on a password for player's log-in, etc.

Figure 6:
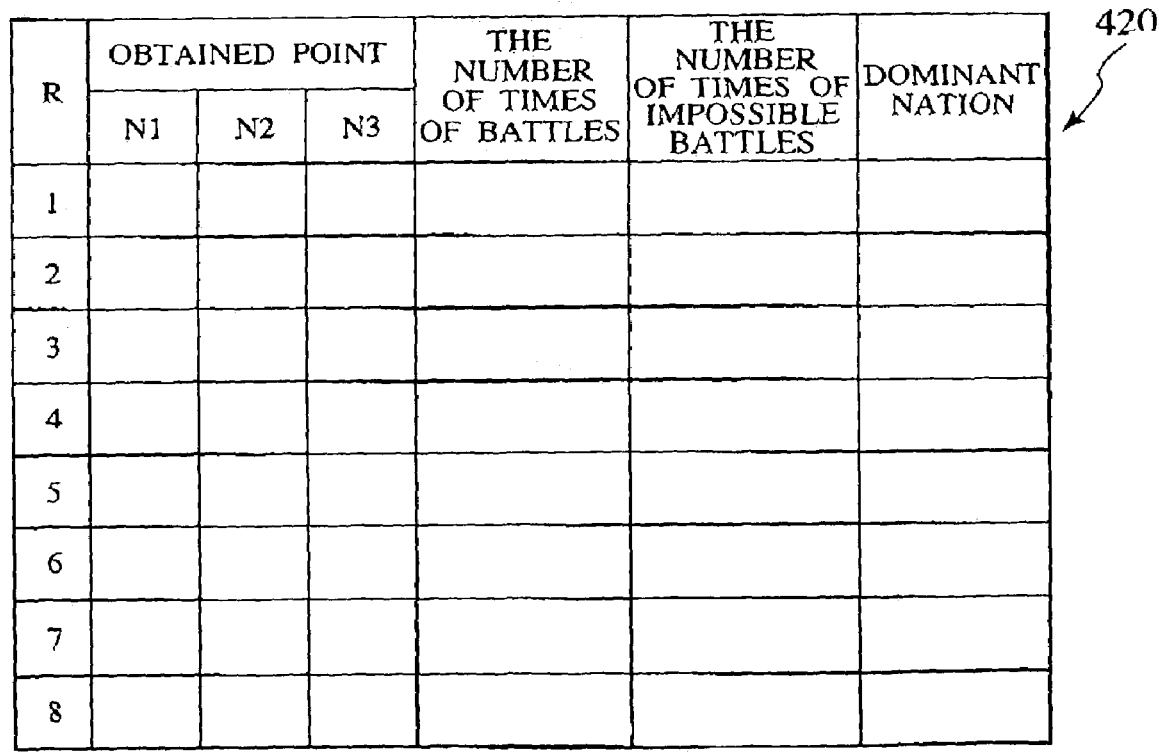
FIG. 6 is a view illustrating an example of a conquest table provided in the game server apparatus according to an embodiment of the present invention.

FIG. 6 is a view showing a conquest table provided in the RAM 205 of the game server apparatus 200. A conquest table 420 is a table that registers a dominant nation of each of the regions R1 to R8 and information necessary for selecting the dominant nation. The conquest table 420 is provided with records corresponding to the respective regions R1 to R8.

On the respective records of the regions R1 to R8, there are registered the total number of points obtained by the player characters from each of the nations N1 to N3 in the area included in the corresponding region within a predetermined period of time, the number of battles waged in the area included in the corresponding region, the number of times the player character could not wage battles, and the dominant nation that dominates the corresponding region.

In the RAM 205 of the game server 200, there is provided an area for setting a nation (superior nation) that dominates four or more regions and becomes superior in the entire world of this game, separately from the conquest table 420. The superior nation is also set by conquest decision processing.

When the dominant nation of each region and the superior nation of the entire world are set in the conquest table 420 or the, area of the RAM 205 by conquest decision processing, a change occurs in the content of the game. Dominant nation information, which includes information on the dominant nation of each region and the superior nation of the entire world that has been set in the conquest table 420, is sent to the game server apparatus 200 and set in the RAM 105 of the video game apparatus 100.

The change in the content of the game hereinafter includes as follows:

A change in the kinds of items and the price thereof that each player character can purchase at the item shop of each of the nations N1 to N3 depending on whether the corresponding nation is the superior nation:

A change in whether a street performer character, which provides information useful to the player, exists on the area maps of the nations N1 to N3 depending on whether the corresponding nation is the superior nation:

A change in whether the respective player characters can purchase items at the item shops of the areas A1 to A15 included in the regions R1 to R8 depending on whether the corresponding nation is dominated by one of the nations N1 to N3;

A change in whether a guard character existing on the area maps of the areas A1 to A15 included in the regions R1 to R8 casts a spell of a crystal buff that makes it easier to obtain a crystal on each player character depending on whether the corresponding nation is dominated by one of the nations N1 to N3; and A change in whether a player character from the corresponding nation can purchase staples at the item shops provided at the nations N1 to N3 depending on whether the nations N1 to N5 are dominant nations of regions R1 to R8.

FIG. 7 is a view showing an experience value calculation table provided in a ROM of the control section 201 of the game server apparatus 200 in advance. This experience value calculation table 430 is used to obtain a basic experience value for calculating an experience value to be distributed to each player character participating in a battle when a single player character or a party composed of multiple characters wins the battle with an enemy character/characters. When the player character or the party wins a battle with multiple enemy characters, a basic experience value of each enemy character is obtained from the experience value calculation table 430. A basic experience value is distributed to each player character based on the total value of the obtained basic experience values.

A basic experience value to be obtained is registered in the experience value calculation table 430 according to a value of a maximum level of all player characters that participated in the battle and a level difference between the level (maximum value) of the enemy characters and the level (maximum value) of the player characters. For example, when a party composed of two player characters (each having level 25 and level 23) wins a battle with an enemy, character (having level 28), the maximum level of the player character falls in the range from 21 to 30 and the level difference is +3, so that a basic experience value to be obtained is 160.

Dominant nation information, which includes information relating to the dominant nation of each region and the superior nation of the entire world set by conquest decision processing, is sent to the video game apparatus 100 from the game server apparatus 200. Dominant nation information is sent to the video game apparatus 100 from the game server apparatus 200 every time a log-in is performed. In the RAM 105 of the video game apparatus 100, there is provided an area for setting dominant nation information received from the game server apparatus 200.

The following explains processing in the network game system according to an embodiment. In this network game, various processing is carried out in parallel by the video game apparatus 100 and the game server apparatus 200 such that multiple players advance the game. Processing relating to the present invention is now explained.

Processing, which is indispensable for advancing the network game (such processing that is also executed in the conventional network game) and which is not shown in the flowchart explained below, includes processing for moving a player character on the world map or area map, and processing of a battle between a player character/characters or the party and an enemy character/characters. In the case where each player character is moved, the player inputs an instruction about a moving direction of the player character from the input section 161 according to a game progress state displayed on the display screen 122. In the case where each player character battles with the enemy character/characters, the player inputs an operation that the player character should perform from the input section 161.

Information on these instructions is sent to the game server apparatus 200 from each of the video game apparatuses 100, and necessary processing (update of the position of the player character, calculation of damage, etc.) is carried out by the game server apparatus 200. When each of the video game apparatuses 100 also needs a processing result, information relating to the processing result is sent to the video game apparatus 100 from the server game apparatus 200 and this is reflected in processing at the side of the video game apparatus 100.

Figure 8:
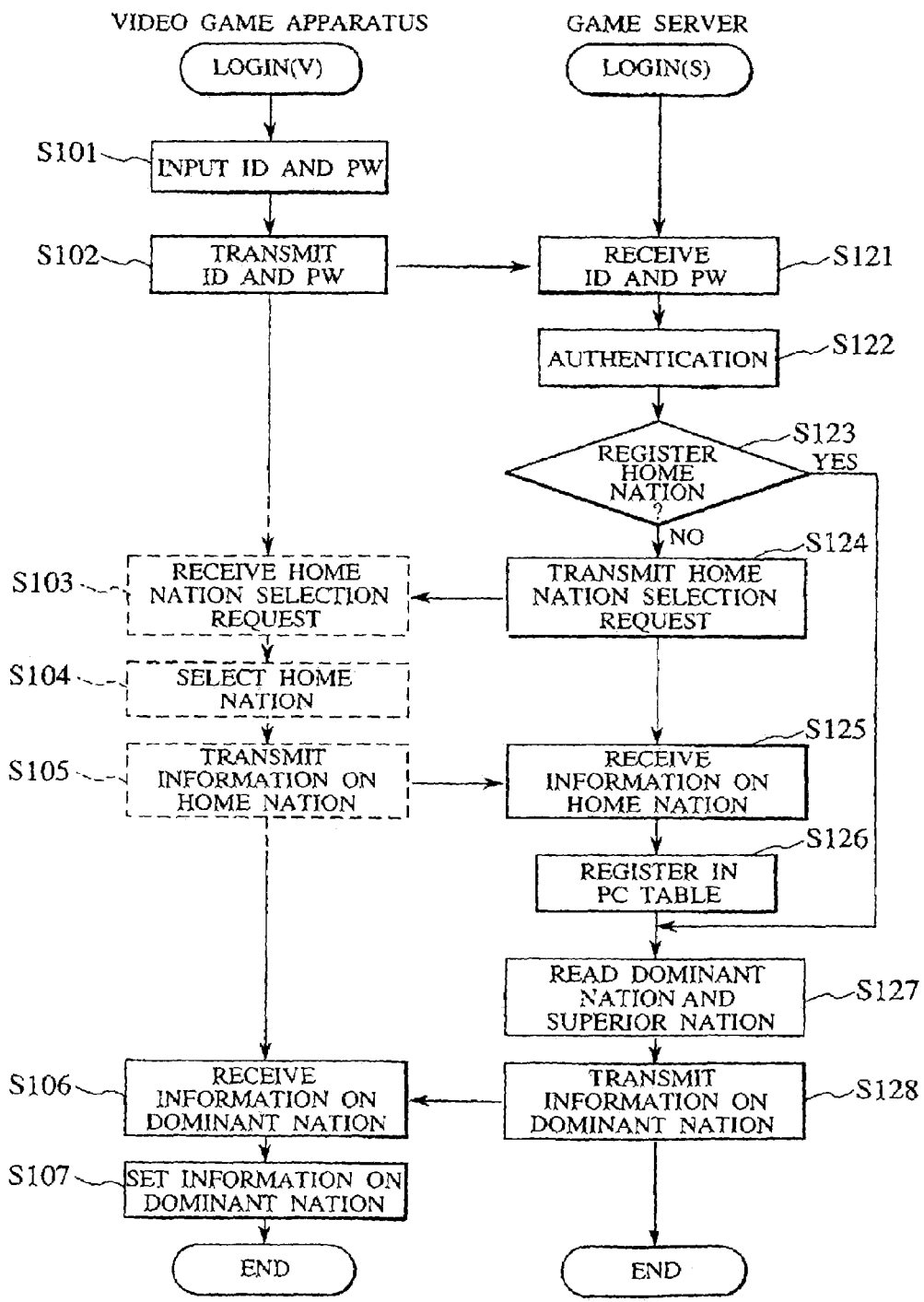
FIG. 8 is a flowchart showing processing when the video game apparatus logs in the network game that the game server apparatus provides according to an embodiment of the present invention.

FIG. 8 is a flowchart showing processing when one of the video game apparatuses 100 logs in the network game that the game server apparatus 200 provides. The left side shows processing at the video game apparatus 100, and the right side shows processing at the game server apparatus 200.

At the time of logging in the network game, the player inputs a player's log-in ID and a password from the input section 161 according to an instruction on the display screen 122 at the video game apparatus 100 (step S101). The log-in ID and password are sent to the game server apparatus 200 from the communications interface 115 via the network 151 (step S102). After receiving the log-in ID and password, the control section 103 of the video game apparatus 100 is in a standby status waiting to receive information from the game server apparatus 200.

In the game server apparatus 200, when the communications interface 215 receives the log-in ID and password (step S121), the control section 203 performs user authentication for the player based on the log-in ID and password (step S122). Unless the user authentication is successful, the log-in of the video game apparatus 100 is rejected. In the case where the user authentication is successful, the control section 203 determines whether the home nation of the player character is registered to be associated with the authenticated log-in ID with reference to the player character table 410 (step S123).

If the home nation of the player character is registered, the processing proceeds to step S127. Unless the home nation of the player character is registered, the control section 203 causes the communications interface 215 to transmit a home nation selection request to the video game apparatus 100 via the network 151 (step S124).

In the video game apparatus 100 that is in the standby status for receiving information from the game server apparatus 200, when receiving the home nation selection request sent from the game server apparatus 200 (step S103), the control section 103 displays a home nation selection screen on the display screen 122. The player operates the input section 161 according to this selection screen and selects a home nation for the corresponding player character (step S104). Information relating to the selected home nation is sent to the game server apparatus 200 from the communications interface 115 via the network 151 (step S105). Even after sending information relating to the home nation, the control section 103 of the video game apparatus 100 is in a standby status waiting to receive information from the game server apparatus 200.

In the game server apparatus 200, when the communications interface 215 receives information relating to the home nation of the player character (step S125), the control section 203 registers the home nation indicated by this information in the player character table 410 associated with the player's log-in ID (step S126). After registering the home nation of the player character, the control section 203 proceeds to processing in step S127.

In step S127, the control section 203 reads the dominant nations of the respective regions R1 to R8 with reference to the conquest table 420, and reads the superior nation of the entire world from a predetermined area of the RAM 105 (step S127). The control section 203 causes the communications interface 215 to transmit dominant nation information, which includes the dominant nations of the respective regions and the superior nation of the world, to the game server apparatus 100 via the network 151 (step S128). This ends processing at the game server apparatus 200.

In the video game apparatus 100 that is in the standby status for receiving information from the game server apparatus 200, when the communications interface 151 receives the dominant information sent from the game server apparatus 200 in step S128 (step S106), the control section 103 sets dominant nation information in a predetermined area of the RAM 105 (step S107). The content of the-game at a game starting (or restarting) time is decided based on the dominant nation information set here. After that, processing of this flowchart ends.

Figure 9:
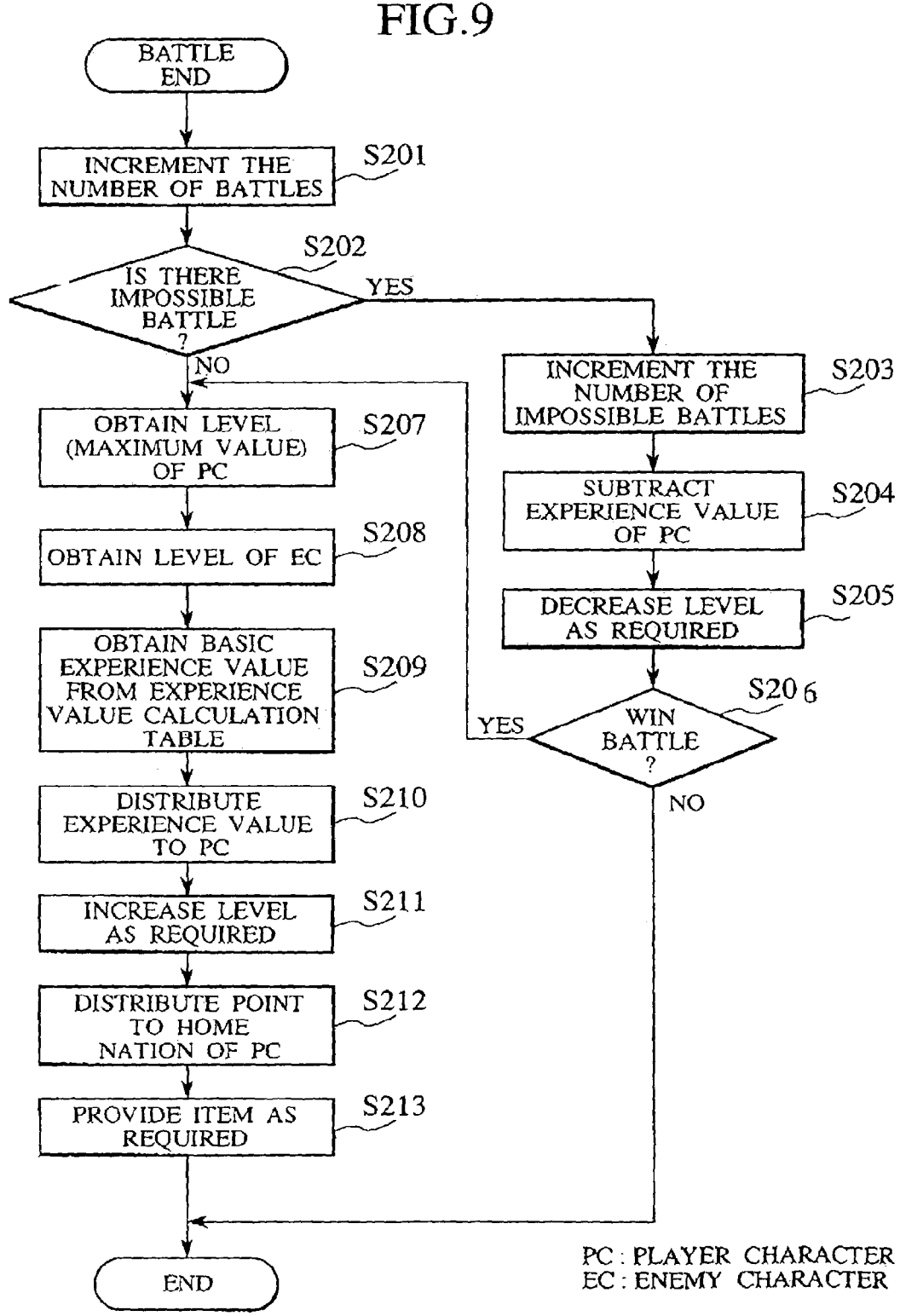
FIG. 9 is a flowchart showing battle end processing executed by the game server apparatus according to an embodiment of the present invention.

FIG. 9 is a flowchart showing battle end processing executed by the game server apparatus 200. Processing of this flowchart is executed subsequent to processing of the battle when the battle between the player characters and the enemy characters ends. In order to simplify the explanation, it is assumed that the battle in this embodiment ends only when the player characters win the battle or any player character cannot wage the battle. In other words, it is assumed that the battle in this embodiment does not end under conditions (e.g., player characters' escape, etc.) except the above.

When the battle ends, the control section 203 increases the number of battles registered in the conquest table 420 by one in connection with the regions R1 to R8 including the area where the battle was waged (step S201). The control section 203 determines whether there is at least one player character that is in a battle impossible state in which it cannot wage the battle, at the ending time of the corresponding battle (step S202). If there is no player character that is in a battle impossible state, the processing proceeds to step S207.

If there is at least one player character that is in a battle impossible state, the control section 203 increases the number of impossible battles registered to the conquest table 420 by one in connection with the regions R1 to R8 including the area where the battle was waged (step S203). The control section 203 subtracts the experience value registered to the player character table 410 by a predetermined amount in connection with the player character that is in the battle impossible state (step S204). The control section 203 decreases the level of the corresponding player characters registered to the player character table 410 if such a need arises due to the above subtraction of the experience value.(step S205).

The control section 203 determines whether the enemy characters are defeated and the battle ends in a victory for the player characters even though at least one of the player characters is in the battle impossible state (step S206). In the case where the battle ends in a state that all player character(s) are in a battle impossible state and that the enemy character(s) win the battle, processing of this flowchart ends. In the case where the battle ends in a victory for the player character(s), processing proceeds to step S207.

In step S207, the control section 203 obtains the level of the player character that participated in the battle (in the case of multiple levels, the maximum value is obtained). The control section 203 further obtains the level of the enemy character that participated in the corresponding battle (step S208). The control section 203 obtains a basic experience value from the experience value calculation table 430 according to the levels of the player character and the enemy character obtained in steps S207 and S208. In the case of winning a battle against multiple enemies, the control section 203 obtains a basic experience value of each enemy character from the experience value calculation table 430, and sets the total value as a basic experience value for distributing an experience value to the player character (step S209).

The control section 203 distributes an experience value to the player character that is not in a battle impossible state at the battle ending time. In the case of a single player character, the control section 203 distributes the basic experience value to the corresponding player character as an experience value directly. In the case of group of player characters, the control section 203 divides the basic experience value by the number of player characters. This value as an experience value is distributed to the player character having the maximum level. A value, as an experience value, obtained by multiplying the divided value by a ratio to the maximum level of the corresponding player character is distributed to the other player characters. The control section 203 adds the distributed experience value to the experience value of each player character registered in the player character table 410 so as to update the value (step S210). The control section 203 increases the level(s) registered in the player character table 410 for the player character(s) that needs the increase in level resulting from the addition of the experience value (step S211).

The control section 203 distributes points, which comply with the experience value distributed to each player character in step S210, to each player character's home nation. In connection with the player character whose home nation is a dominant nation of regions R1 to R8 where the battle was waged, points equivalent to, for example, 1/10 of the experience value are distributed as national points. In connection with the player character whose home nation is not a dominant nation, points equivalent to, for example, 1/5 of the experience value (namely, twice the points of the case of the dominant nation) are distributed as national points. The control section 203 adds the distributed points to the obtained points of each nation registered in the conquest table 420 so as to update the value in connection with regions R1 to R8 including an area where a battle was waged (step S212).

The control section 203 provides an item/items, which complies with the kind of the defeated enemy characters, to the player character (or the party) based on a calculation result obtained by combining various conditions of the battle with a random function. The status of the player character, on which a spell of a crystal buff is cast, changes to increase probability that crystal will be provided as an item (step S213). Then, processing of this flowchart ends.

Figure 10:
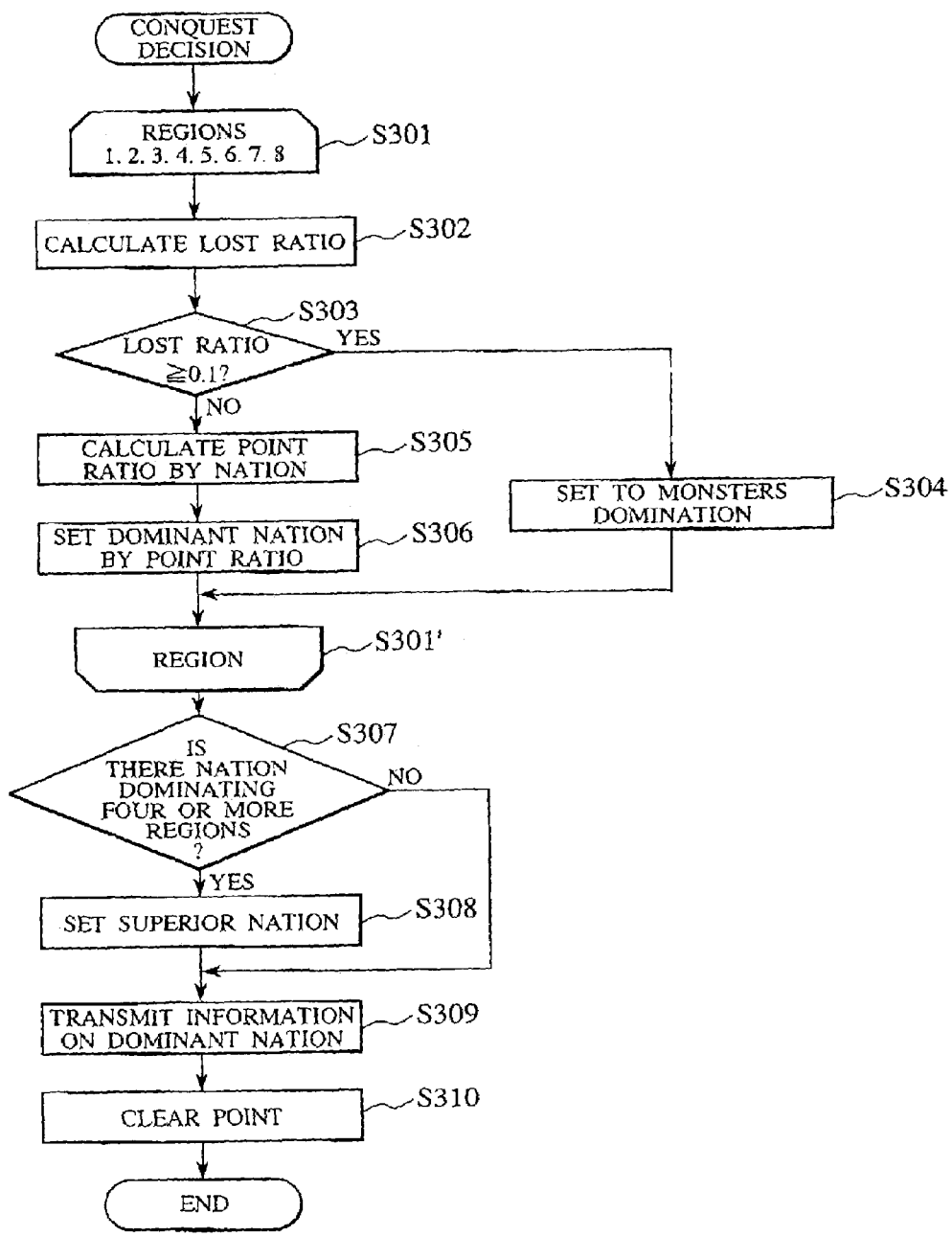
FIG. 10 is a flowchart showing conquest decision processing executed by the game server apparatus according to an embodiment of the present invention.

FIG. 10 is a flowchart showing conquest decision processing executed by the game server apparatus 200. Processing of this flowchart is executed at a predetermined time interval (for example, every week). When the dominant nation of each region and the superior nation are set as a result of this conquest decision processing, a change occurs in the content of the game.

In the conquest decision processing, the control section 203 performs loop processing of steps S301 to S301' in connection with each of the regions R1 to R8 registered in the conquest table 420. In the loop of step S301 to S301', regarding each of the regions R1 to R8 to be processed, the control section 203 divides the number of times of impossible battles registered in the conquest table 420 by the number of battles and calculates a lost ratio in the region to be processed (step S302). The control section 203 determines whether the calculated lost ratio is, for example, 0.1 or greater (step S303).

In the case where the lost ratio is 0.1 or greater, the control section 203 sets a dominant nation of the region to be processed to monster domination (the enemy character is included as a monster) (step S304). In the case where the lost ratio is below 0.1, the control section 203 obtains a ratio of obtained points by nation, which are registered in the conquest table 420, regarding the region to be processed (step S305). The control section 203 sets a dominant nation of the region to be processed according to the ratio of obtained point by nation. If there is a nation having the obtained points equivalent to more than 50% of the entire points (this is naturally ranked in the first place), the corresponding nation becomes the dominant nation of the processing region. If there is no such a nation, the processing region is in a neutral state (state where no dominant nation exists) regardless of the rank in the obtained points by nation (step S306).

When processing in steps S302 to S306 to which all regions R1 to R8 are subjected ends, the control section 203 passes through loop processing in steps S301 to S301'. After passing through the loop, the control section 203 determines whether there is a nation, which dominates four or more regions of the regions R1 to R8, with reference to the conquest table 420 (step S307). If there is a nation, which dominates four or more regions, the control section 203 sets the corresponding nation, as a superior nation, in RAM 205 (step S308), and proceeds to processing in step S309. If there is no nation, which dominates four or more regions, the processing proceeds to step S309.

In step S309, the control section 203 causes the communications interface 215 to transmit dominant nation information, which includes the dominant nations of the respective regions R1 to R8 set in step S306 and the superior nation set in step S308, to all of the video game apparatuses 100 via the network 151 (step S309). Dominant nation information set in the RAM 105 of each of the video game apparatuses 100 is thereby updated. The control section 203 clears the obtained points of each region registered in the conquest table 420 (step S310). After that, processing of this flowchart ends.

Figure 11:
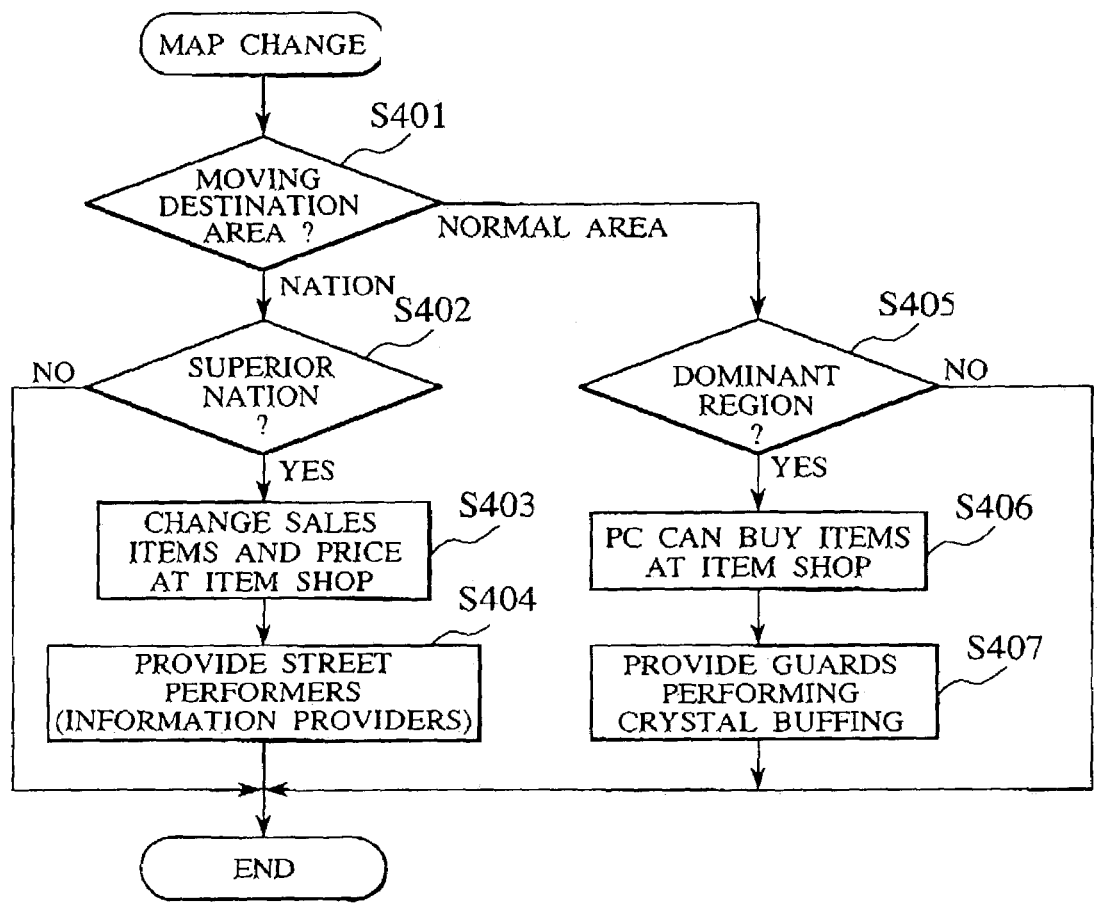
FIG. 11 is a flowchart showing map change processing executed by the video game apparatus according to an embodiment of the present invention.

FIG. 11 is a flowchart showing map change processing executed by each of the video game apparatuses 100. Processing of this flowchart is executed when the player character for the player is moved to a new area (including nation) by the operation of the input section 161 by the player. This can be also executed when dominant nation information is received from the game server apparatus 200 in steps S128 or S309 and the player character exists in any one of areas. In the explanation of this flowchart, the player character means the player character for the player who plays the game using the video game apparatus 100 that is executing processing.

In the map change processing, the control section 103 determines whether an area the player character has moved to (area where the player character existed at the previous logout time just after logging in) is any one of the nations N1 to N3 or any one of the areas A1 to A15 (step S401).

When determining that an area as a moving destination is one of the nations N1 to N3, the control section 103 determines whether the nation as the moving destination is a superior nation based on dominant nation information stored in the RAM 105 (step S402). In the case where the nation as the moving destination is not a superior nation, map change processing ends.

If the nation as the moving destination is a superior nation, the control section 103 changes the kinds of items and prices from a default state to a state that the kinds of items, which are sold to the player character belonging to the corresponding nation at the item shop existing on the area map of the nation, are increased and their prices are reduced. The kinds of items, to be increased include staples related to the area of the dominant region (step S403). This makes it easier to obtain items when the player character belongs to the corresponding nation, with the result that the player can advance the game advantageously.

The control section 103 provides a street performer character on the area map of the nation as the moving destination of the player character (step S404). In the case where the player character belongs to the corresponding nation, useful information can be obtained by speaking to the street performer character and the player can advance the game advantageously. By the presence of the street performer character, a change also appears on an outward appearance in the area map of the corresponding nation. After that, the map change processing ends.

When determining that an area as a moving destination is any one of the normal areas A1 to A15, the control section 103 determines whether the player character's home nation is a dominant nation of the regions R1 to R8 including the corresponding areas A1 to A15 based on dominant nation information stored in the RAM 105 (step S405). In the case where the player character's home nation is not a dominant nation of the regions including the corresponding areas, the map change processing ends.

In the case where the player character's home nation is a dominant nation of the regions including the corresponding areas, the control section 103 provides a setting so that the player character can purchase items at the item shop in the corresponding area (step S406). Consequently, the player character belonging to the nation that dominates the regions including the corresponding areas can obtain items at the item shop in the corresponding area, and the player can advance the game advantageously.

The control section 103 chances a default-setting character to a character that casts a spell of a crystal buff on the player character in connection with the guard character provided on the area map of the area (step S407). The status of the player character, whose home nation dominates the region including the corresponding area, changes to increase the probability that crystal will be provided as an item. The change in this status makes it possible for the player to advance the game advantageously. After that, the map change processing ends.

Figure 12:
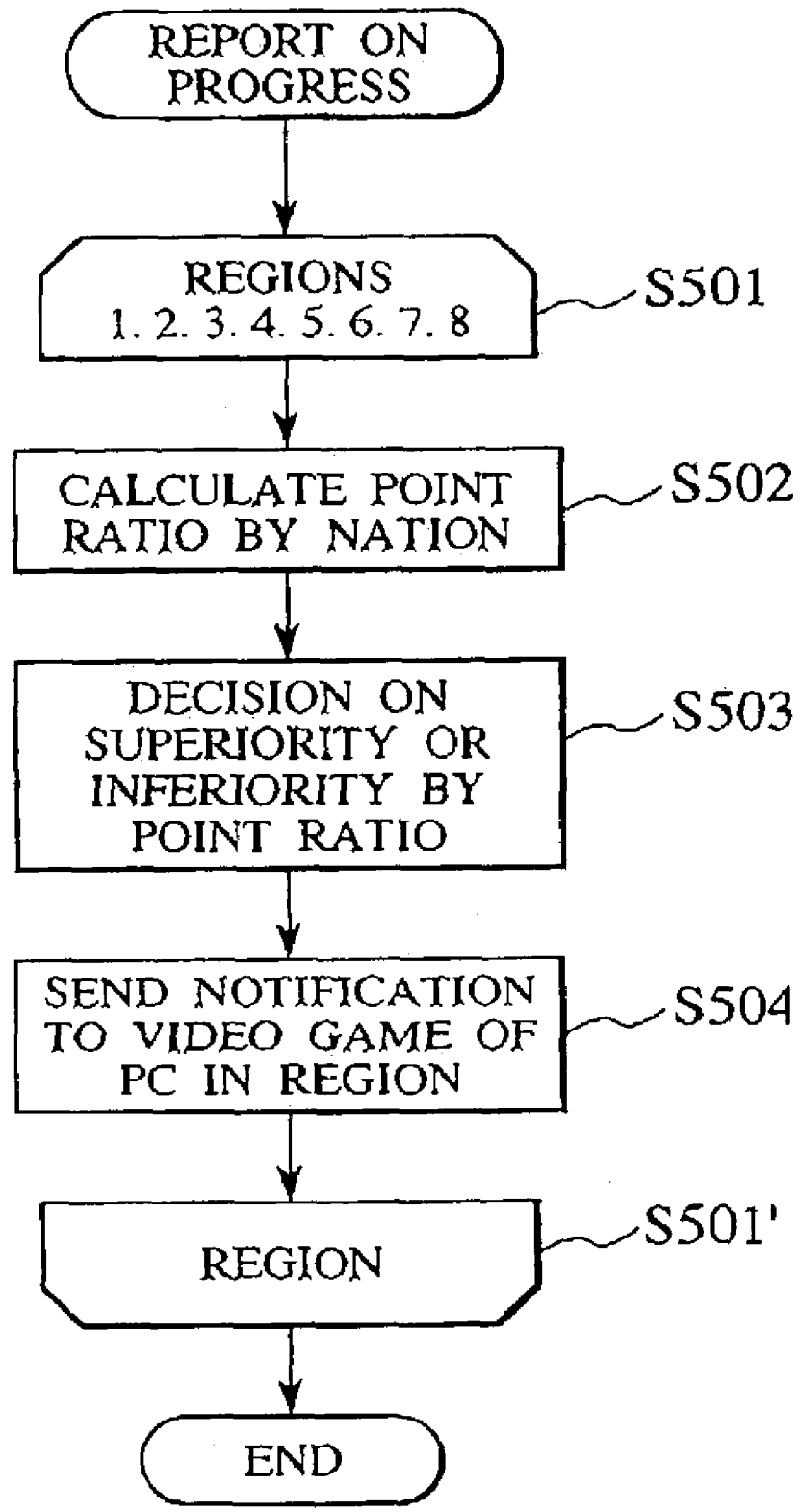
FIG. 12 is a flowchart showing progress report processing executed by the game server apparatus according to an embodiment of the present invention.

FIG. 12 is a flowchart showing progress report processing executed by the game server apparatus 200. Processing of this flowchart is executed at a predetermined time interval, (for example, every hour) which is shorter than the time interval with which the conquest decision processing is executed. The progress report processing aims to simply provide information to players and not generate a change in the content of the game itself.

In the progress report processing, loop processing of steps S501 to S501' is carried out in connection with each of the regions R1 to R8 registered in the conquest table 420. In the loop of steps S501 to S501', the control section 203 obtains a ratio of obtained points by nation, which are registered in the conquest table 420, regarding the processing region (step S502).

The control section 203 determines superiority or inferiority of the respective nations in the processing regions R1 to R8 according to the ratio of obtained points by nation. Here, a nation, in which obtained points are 50% or more of the entirety, is determined as superior. A nation, in which obtained points are less than 50% of the entirety and are ranked in the first place, is determined as somewhat superior. A nation, in which obtained points are not ranked in the first place but are 30% or more of the entirety, is determined as somewhat inferior. A nation, in which obtained points are less than 30% of the entirety, is determined as inferior (step S503).

The control section 203 causes the communications interface 215 to report information on superiority or inferiority of each nation to each of the video game apparatuses 100 of the player where his/her player character exists in the region to be processed via the network 151 with reference to the player character table 410 (step S504). In each of the video game apparatuses 100 that receives this report, superiority or inferiority of each nation at the present time is displayed on the display screen 122. When processing in steps S502 to S504 to which all regions R1 to R8 are subjected ends, the control section 203 passes through the loop processing in steps S501 to S501'. After passing through the loop, the processing of this flowchart ends.

Figure 13:
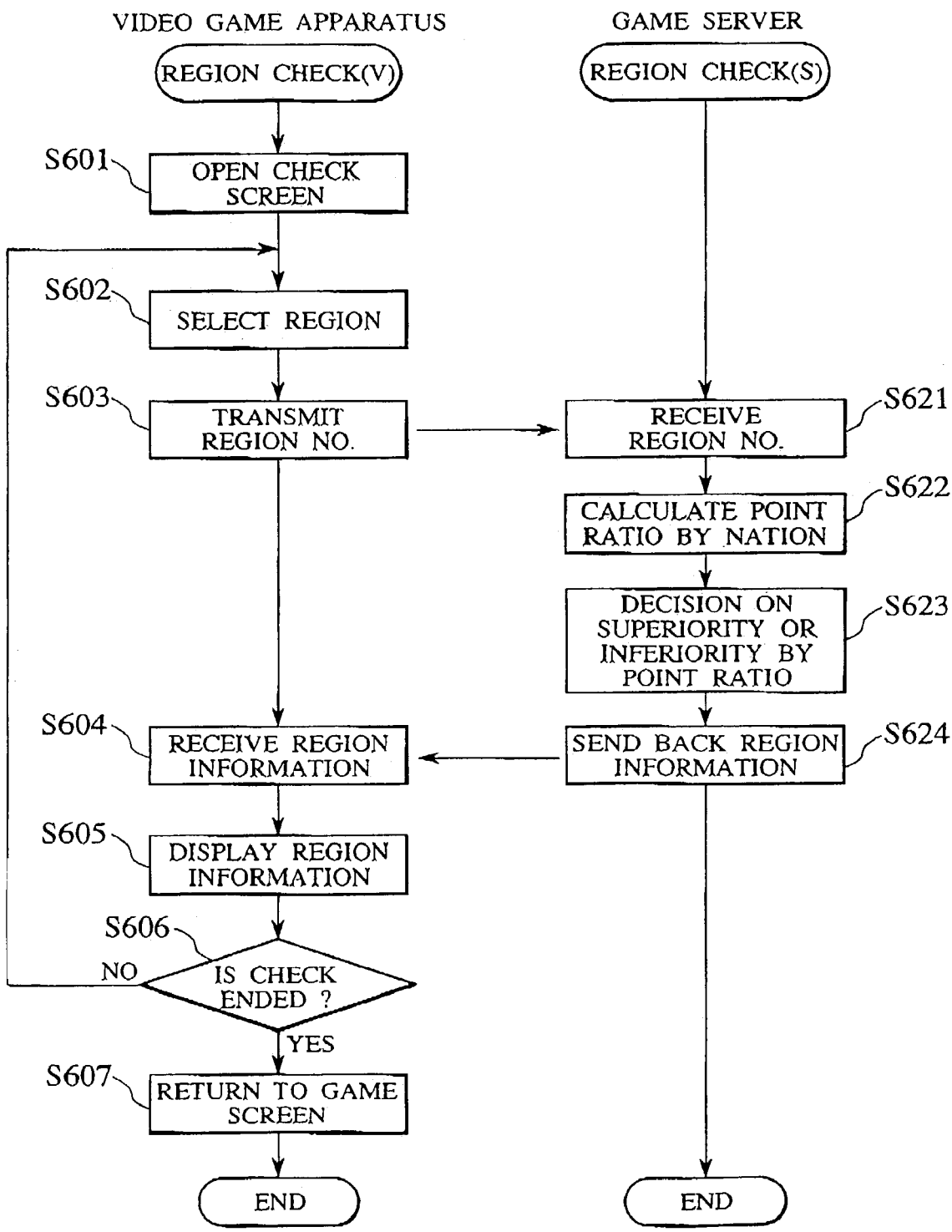
FIG. 13 is a flowchart showing region information check processing executed by access to the game server apparatus from the video game apparatus according to an embodiment of the present invention.

FIG. 13 is a flowchart showing region information check processing executed by access to the game server apparatus 200 from one of the video game apparatuses 100. The left side shows processing at the video game apparatus 100, and the right side shows processing at the game server apparatus 200. The region information check processing also aims to simply provide information to a player and not generate a change in the content of the game itself.

When the player operates the input section 161 and inputs a predetermined instruction, the control section 103 displays a region information check screen on the display screen 122 (step S601). The player operates the input section 161 according to the region information check screen and selects any of the regions R1 to R8 (step S602). The control section 103 causes the communications interface 115 to transmit a number of the region selected by the player to the game server apparatus 200 via the network 151 (step S603).

In the game server apparatus 200, when the communications interface 215 receives the number of the region (step S621), the control section 203 obtains a ratio of obtained points by nation, which are registered in the conquest table 420, regarding one of the regions R1 to R8 shown by the received number (step S622).

The control section 203 determines superiority or inferiority of the respective nations in the regions R1 to R8 corresponding to the received number according to the ratio of obtained points by nation. Here, a nation, in which obtained points are 50% or more of the entirety, is also determined as superior. A nation, in which obtained points are less than 50% of the entirety and are ranked in first place, is determined as somewhat superior. A nation, in which obtained points are not ranked in the first place but are 30% or more of the entirety, is determined as somewhat inferior. A nation, in which obtained points are less than 30% of the entirety, is determined as inferior (step S623). The control section 203 causes the communications interface 215 to send back information on superiority or inferiority of each nation as region information to the video game apparatus 100 via the network 151 (step S624).

In the video game apparatus 100, when the communications interface 115 receives region information sent back from the game server apparatus 200 (step S604), the control section 103 displays information on superiority or inferiority of each nation in one of the regions R1 to R8 selected in step S602 (step S605).

The control section 103 determines whether an end of region information check is instructed from the input section 161 by the player (step S606). If the end of region information check is not instructed, the processing proceeds to step S602. If the end of region information check is instructed, the control section 103 returns the display screen 122 to the original game screen (step S607) and ends the region information check processing.

The following specifically explains the flow of the progress of the game in the network game system according to this embodiment with reference to a specific example of the display screen 122 of the video game apparatus 100.

Figure 14A:
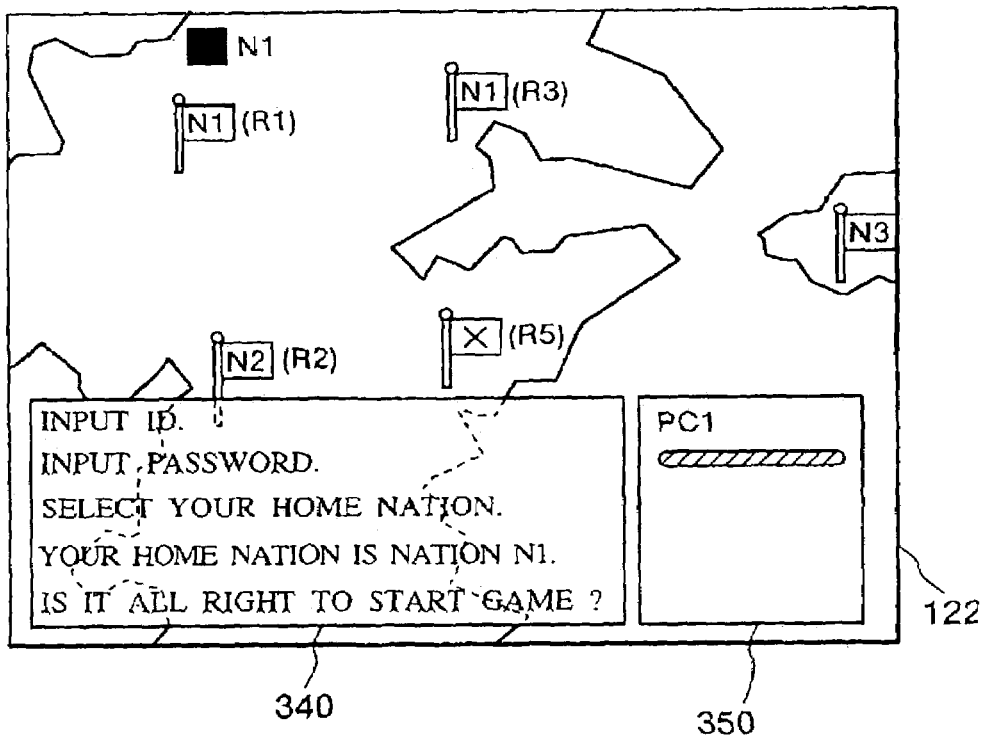
FIG. 14A is a view showing an example of a game screen at a log-in time according to an embodiment of the present invention.

FIG. 14A is a view showing an example of the display screen 122 at a log-in time. As shown by a message in a chat window 340, the player inputs a log-in ID and further inputs a password, and selects a home nation of his/her player character (note that this is carried out only during an initial log-in time). When the video game apparatus 100 logs in the network game, dominant nation information is sent to the video game apparatus 100 from the game server apparatus 200, the world map 400 is displayed on the display screen 122, and national flags of the current dominant nations are displayed in connection with the respective regions R1 to R8. Moreover, a part of a status of the player character is displayed in a status window 350.

Figure 14B:
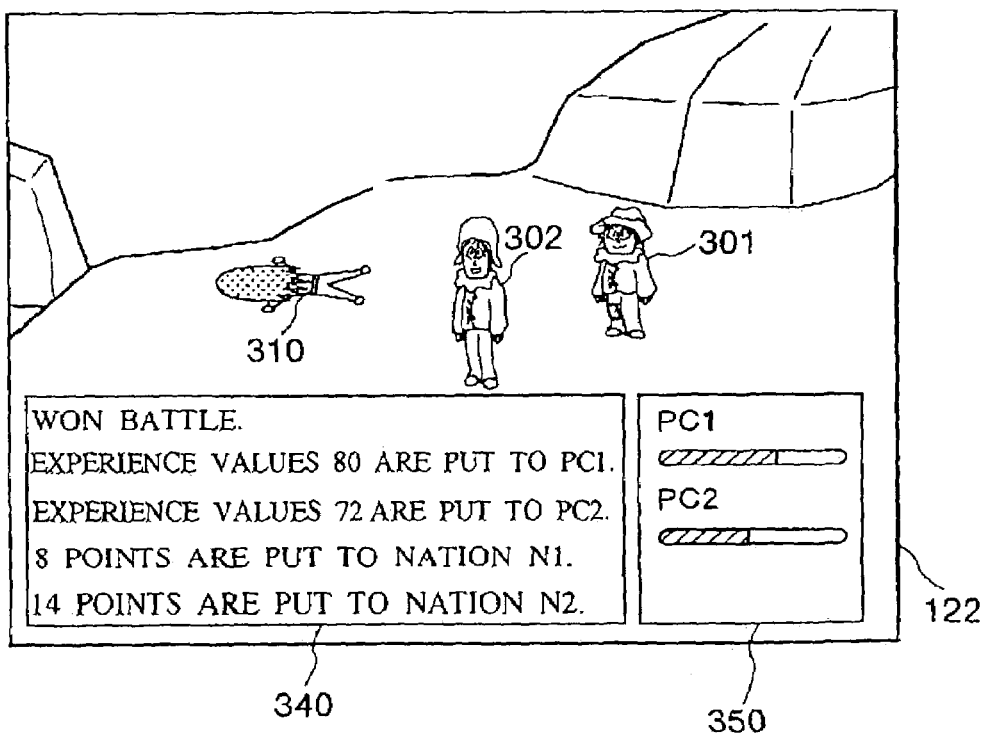
FIG. 14B is a view showing an example of a game screen at the time of ending a battle according to an embodiment of the present invention.

FIG. 14B is a view showing an example of the display screen 122 at a battle ending time. As shown in the chat window 340, it is assumed that a party, which is composed of a character 301, which belongs to a nation N1, and a character 302, which belongs to a nation N2, defeats an enemy character 310 in a battle. It is also assumed that a region including this area is dominated by the nation N1. As shown by a message in the chat window 340, as a result of the victory of this battle, experience values 80 and 72 are provided to the player characters 301 (PC1) and 302 (PC2), respectively, and 8 points and 14 points are respectively provided to the nations N1 and N2 to which the player characters 301 and 302 belong.

Figure 15A:
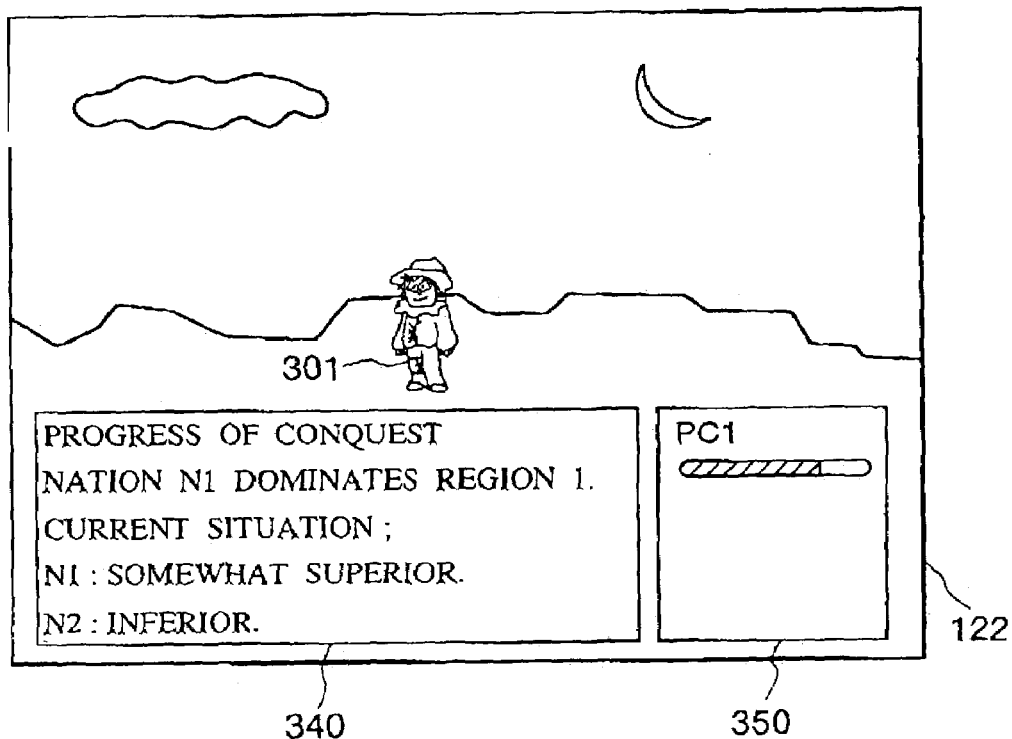
FIG. 15A is a view showing an example of a game screen at a progress reporting time according to an embodiment of the present invention.

FIG. 15A is a view showing an example of the display screen 122 at a progress reporting time. It is assumed that progress report processing is carried out when the player character 301 is in an area A1 or A2 of the region R1. In this case, information on superiority or inferiority of nations N1 to N3 about the region R1 is reported from the game server apparatus 200, and the reported information is displayed in the chat window 340 as a message. A current dominant nation of region R1 is also displayed in the chat window 340 based on dominant nation information stored in the RAM 105.

Figure 15B:
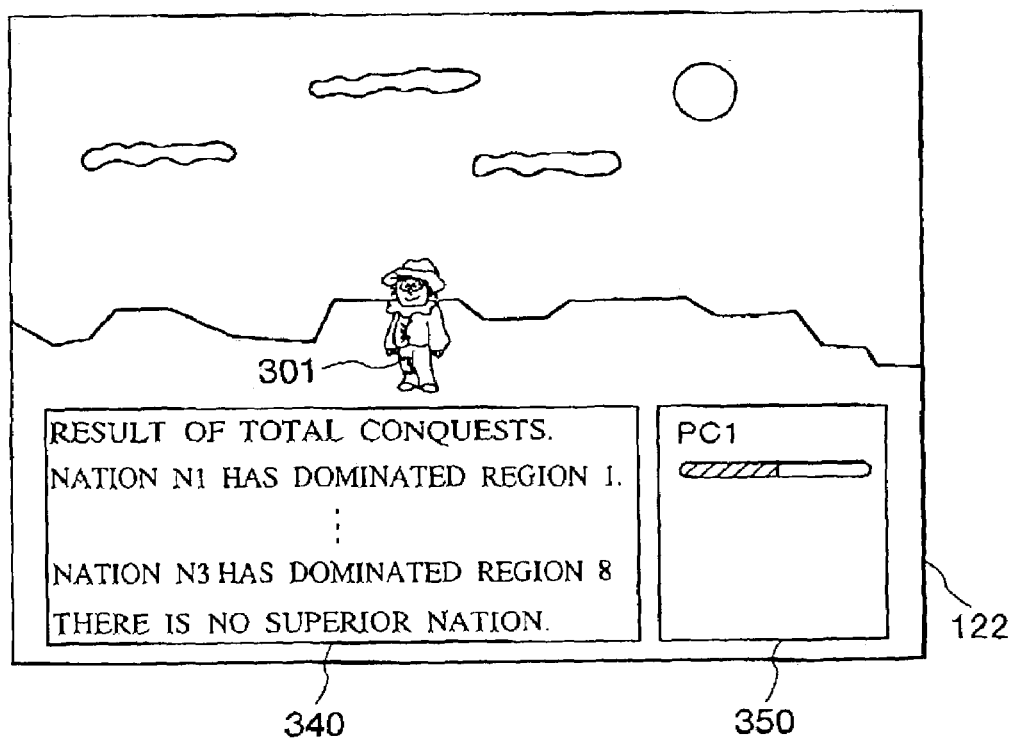
FIG. 15B is a view showing an example of a game screen at a conquest deciding tine according to an embodiment of the present invention.

FIG. 15B is a view showing an example of the display screen 122 at a conquest deciding time. It is assumed that conquest decision processing is carried out when the player character 301 is in an area A1 or A2 of the region R1. In this case, dominant nation information, which includes a new dominant nation about each of the regions R1 to R8 and a superior nation, is reported from the game server apparatus 200 regardless of the fact that the player character 301 is in the region R1. A new dominant nation of each of the regions R1 to R8 and a superior nation are displayed as a message in the chat window 340 based on this dominant nation information.

Figure 16A:
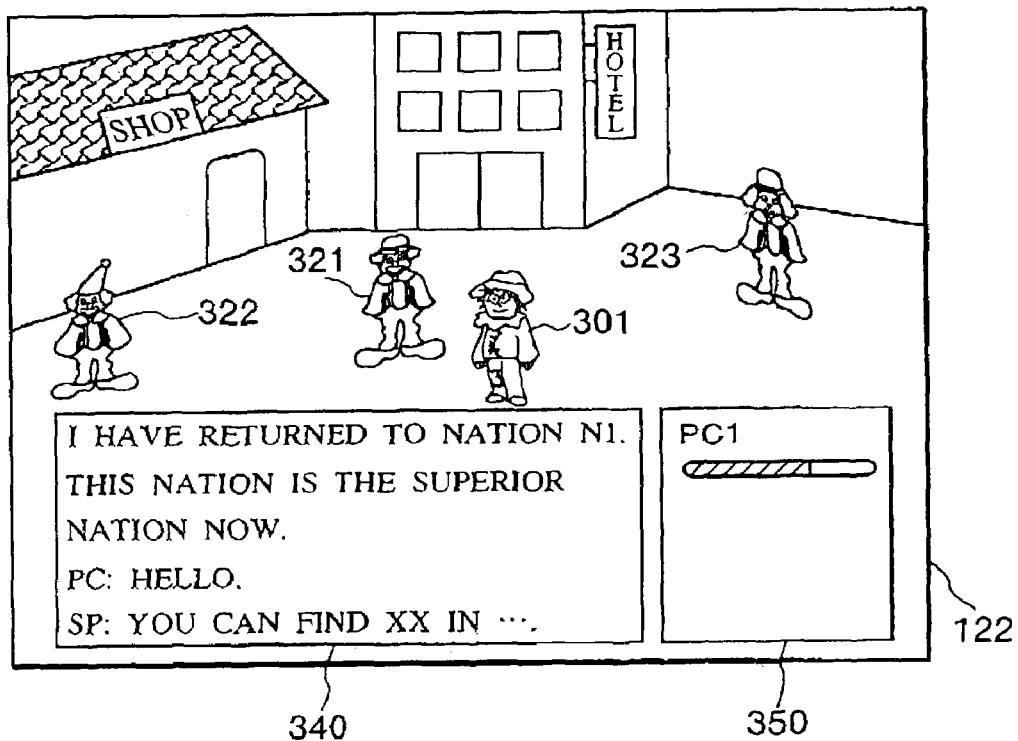
FIGS. 16A and 16B are views each showing an example of a game screen when the player character is in a home nation according to an embodiment of the present invention.
Figure 16B:
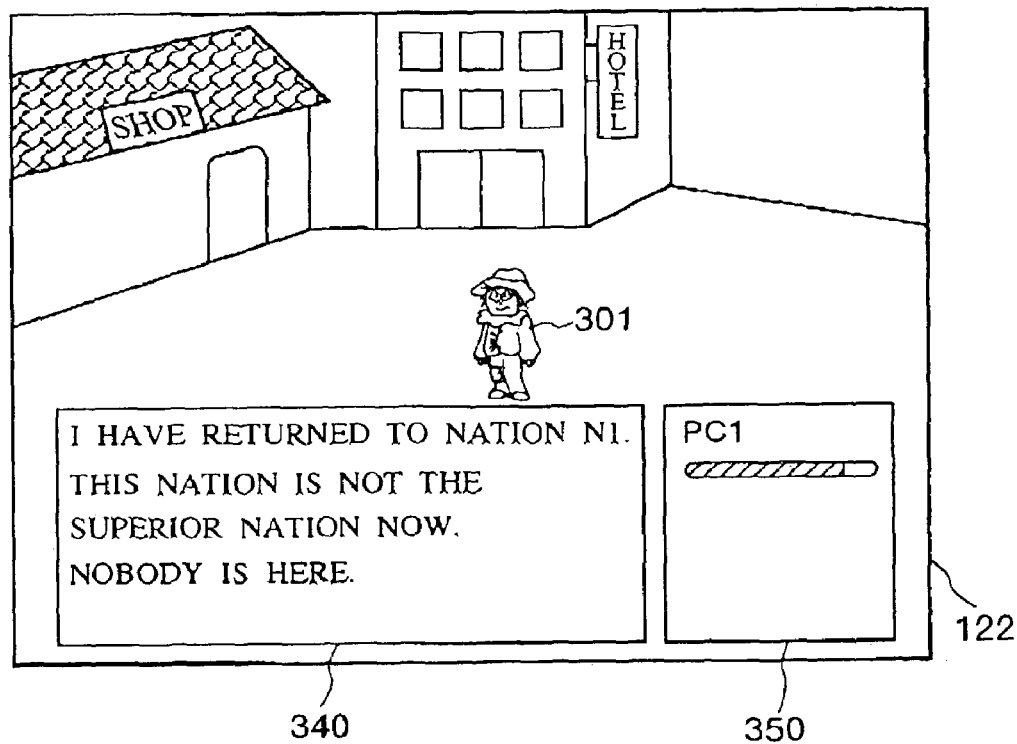

FIGS. 16A and 16B are views each showing an example of the display screen 122 when the player character is in its home nation. In the case where the home nation of the player character is a superior nation (FIG. 16A), street performer characters 321 to 323 are present on the area map of the corresponding nation. As shown by a message in the chat window 340, when the player character 301 speaks to the street performer character 321, the player can obtain information useful for the progress of the game. In the case where the home nation of the player character is not a superior nation (FIG. 16B), no street performer character is present on the area map of the corresponding nation. Since there is no counterpart to whom the player character 301 speaks, the player cannot obtain useful information that can be acquired when the home nation of the player character is the superior nation.

Figure 17A:
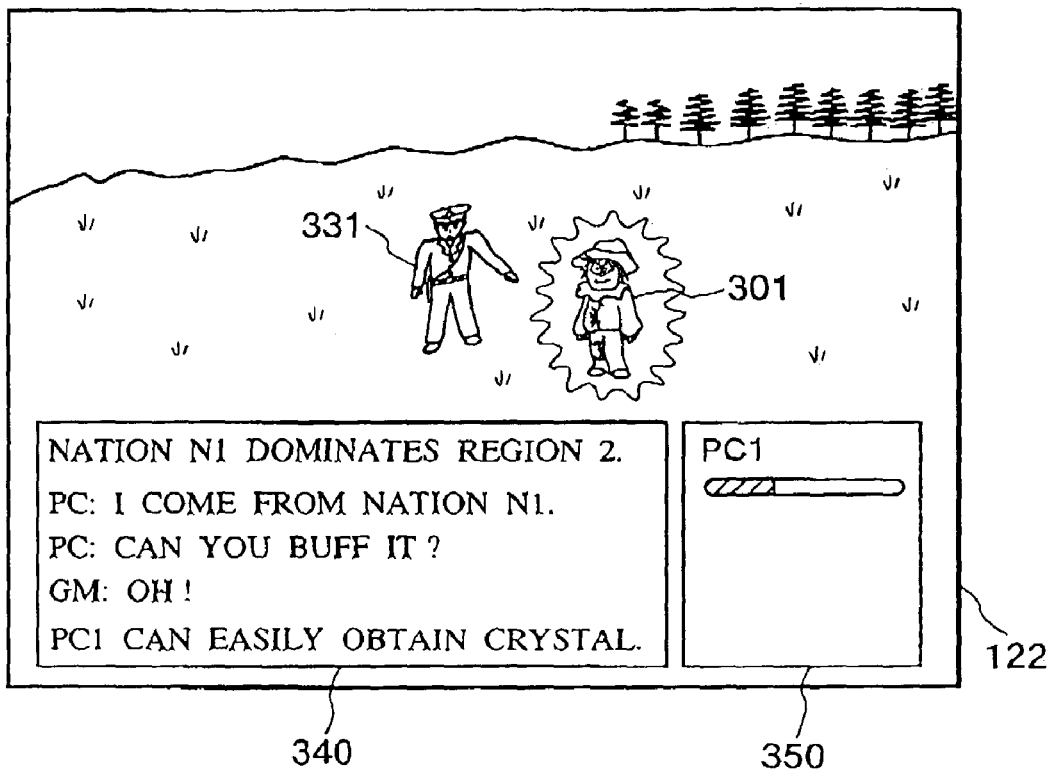
FIGS. 17A and 17B are views each showing an example of a game screen when, the player character is in an area other than the nation according to an embodiment of the present invention.
Figure 17B:
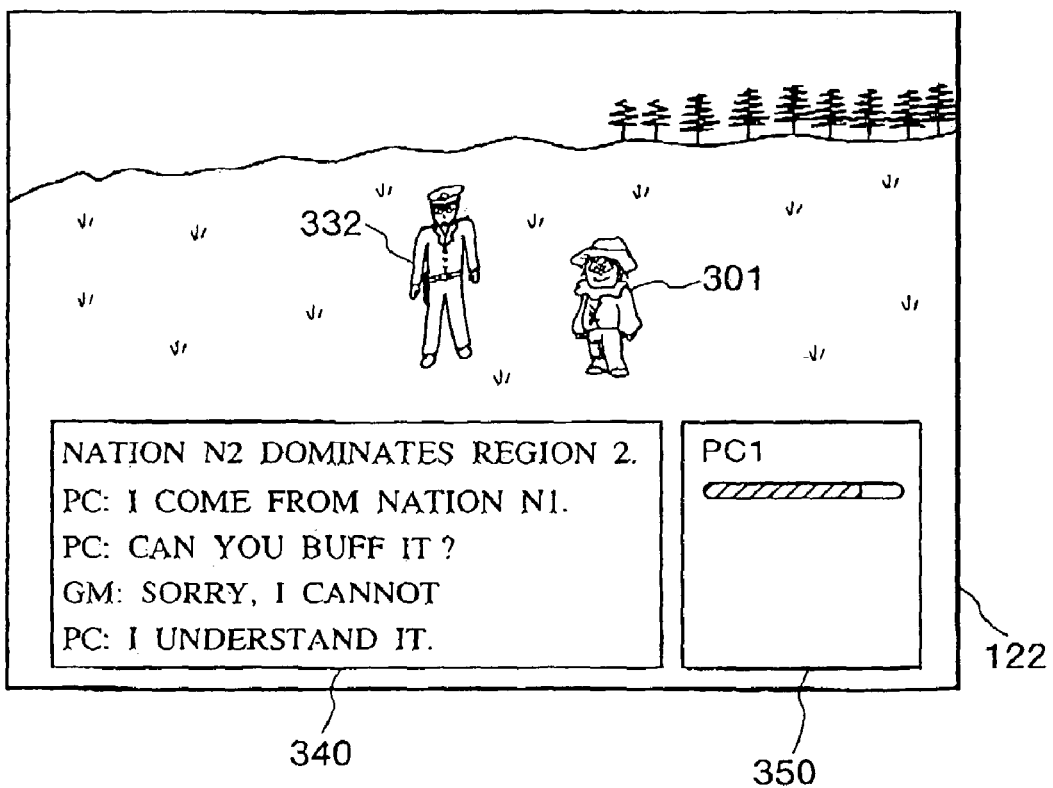

FIGS. 17A and 17B are views each showing an example of the display screen 122 when the player character is an area other than the nations. In the case where the home nation of the player character is a dominant nation of the region including the corresponding area (FIG. 17A), when the player character 301 makes a request to cast a spell of a crystal buff by the guard character 331 as shown by a message in the chat window 340, the spell of the crystal buff is cast by the guard character 331. By casting the spell, the player character 301 is in a status that the player character 301 can easily obtain a crystal. In the case where the home nation of the player character is not a dominant nation (FIG. 17B), even when the player character 301 makes a request to cast a spell of a crystal buff on the guard character 332 as shown by a message in the chat window 340, the spell of the crystal buff cannot be cast by the guard character 332. Namely, the player character 301 is not in a status that the player character 301 can easily obtain a crystal.

Figure 18A:
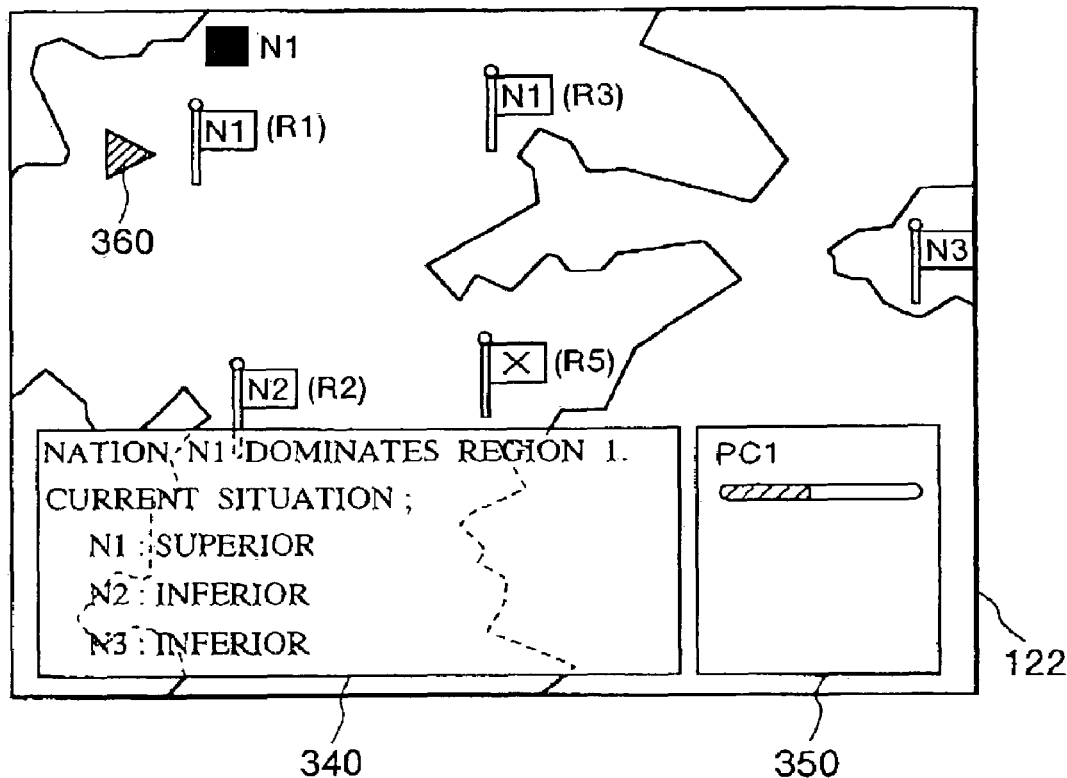
FIGS. 18A and 18B are views each showing an example of a game screen at a region information checking time according to an embodiment of the present invention.
Figure 18B:
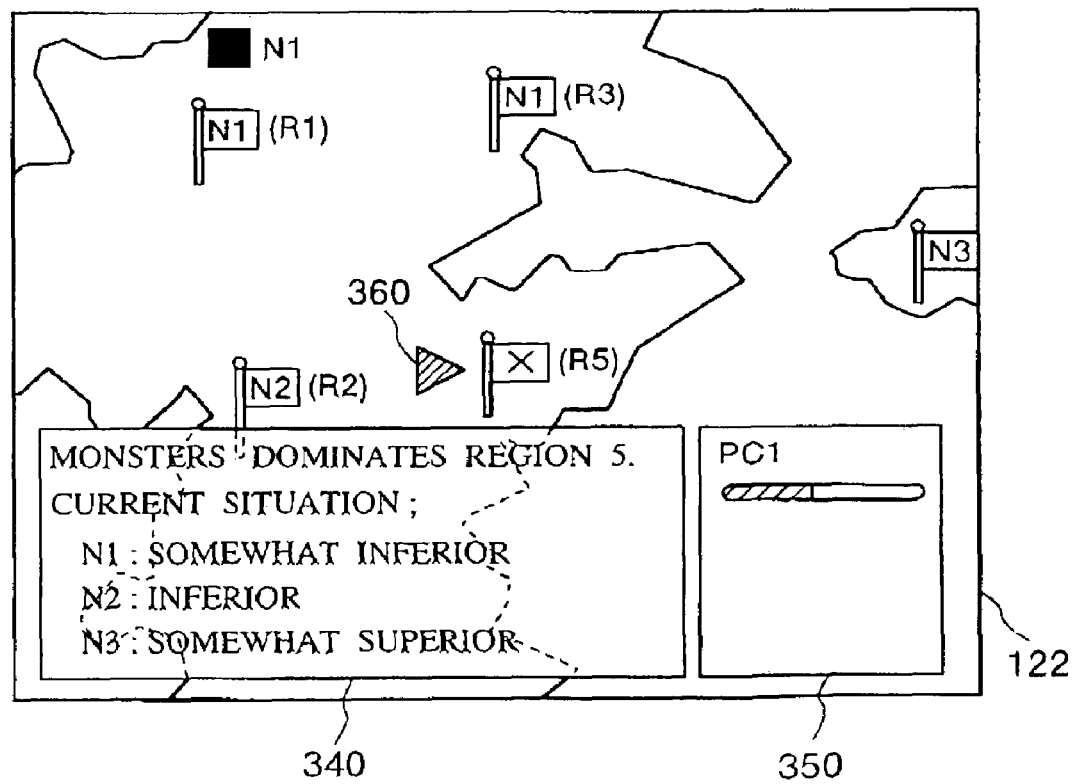

FIGS. 18A and 18B are views each showing an example of the display screen 122 at a region information checking time. In connection with a region information check screen, the world map 400 is displayed on the display screen 122, and a national flag of a current dominant nation of each of the regions R1 to R8 is displayed. As shown in FIG. 18A, if a cursor 360 is adjusted to the region R1, a current dominant nation and a state of superiority or inferiority of each nation up to the present from the previous conquest decision are displayed in the chat window 340 in connection with the region R1. As shown in FIG. 18B, if the cursor 360 is adjusted to the region R5, a current dominant nation and a state of superiority or inferiority of each nation up to the present from the previous conquest decision are displayed in the chat window 340 in connection with the region R5. Even if the cursor 360 is adjusted to another region, a current dominant nation and a state of superiority or inferiority of each nation up to the present from the previous conquest decision are displayed similarly in connection with the region to which the cursor 360 is adjusted.

As explained above, in the network game system according to this embodiment, the respective players, who participate in the network game, select the nations N1 to N3 to which their player characters belong at an initial log-in time, respectively. The selected home nations of the player characters are registered to the player character table 410. If each player character wins a battle with an enemy character/characters, points, which correspond to an experience value given to each player character, are distributed to each home nation. The content of the game is changed according to the result of the total points distributed to the home nation. The content of the game is changed by not only the operation of the player character for each player but also the operation of the player characters for other players. Accordingly, each of the players feels significant change in the content of the game and does not feel the progress of the game is monotonous even if the game lasts for a long period of time.

Since the content of the game is changed according to the points totaled by each of nations N1 to N3 to which the player characters belong, the respective players can have a sense of loyalty to their selected nations. A high sense of loyalty to each nation results in a motivation for each player to perform communication with the other players (particularly, persons whose player character belongs to the same nation). This makes it smooth to perform communication between the players and to prevent the progress of the game from becoming monotonous. Since communication between the players is smoothly carried out, a hostile atmosphere such as a battle between the player characters does not occur between the players. Even if the sense of loyalty to the nation increases with respect to each player, the party of the player characters, which belong to different nations, is not prevented from advancing the game.

The areas A1 to A15 on the world map are included in any one of the regions R1 to R8. The points, which are given to the home nation when the player character wins the battle, are totaled for every region where the corresponding battle was waged, and the dominant nation is decided for every region. There is a case that dominion of each region is given to the monsters depending on the lost ratio. Accordingly, since the player character moves to a different region and thereby develops the game differently, this prevents the game from being monotonously advanced.

The obtained points of the respective nations N1 to N3 in the respective regions R1 to R8 are totaled for a predetermined period of time between the conquest decision processings, and the resultant points are used to decide a dominant nation. A dominant nation of each of the regions R1 to R8 is changed for each predetermined period, and the change of the dominant nation causes a change in the content of the game. The nations N1 to N3 must obtain points of 50% or more in order to dominate the regions R1 to R8, respectively. The nations N1 to N3 cannot easily establish dominion of the regions R1 to R8. The content of the game results in having elements for a national competition.

The points corresponding to the experience value are given to the nation(s) when the player character(s) of the home nation(s) win the battle. Regarding the beginning nation of the player character where the home nation is not the dominant nation of the region, substantially double points are given to the nation as compared with the home nation of the player character where the home nation is the dominant nation of the region. This makes it easier to change the dominant nation of each of the regions R1 to R8 every time when the conquest decision is carried out, and it is expected that the change in the content of the game will become extreme.

Since the experience value given to the player character differs depending on a level difference between the player character and the enemy character, the experience value is appropriately decided according to the degree of difficulty in the battle. In the case where a group of player characters participate in the battle, the experience value is distributed from the basic experience value according to each player's level. Accordingly, the experience value can be fairly distributed to each player character according the degree of distribution of each player character to the battle. This means that the points can be appropriately and fairly given to each nation.

In the case where the home nation is a dominant nation of any one of the regions R1 to R8, the player character can purchase items at an item shop of an area included in the region. Since the player character can purchase the items under an advantageous condition in the region where the home nation is the dominant nation, the player can advance the game advantageously. The spell of the crystal buff can be cast on the player character by the guard character in the area of the region where the home nation is the dominant nation. Since this spell brings about a status that the player character can easily obtain the crystal, the player can advance the game advantageously.

In the case where the home nation is the superior nation of the entire world, the number of the kinds of items, which the player character can purchase at the item shop existing in the home nation of the player character, is increased and the prices of items are decreased. Since the player character can purchase the items under advantageous conditions when the home nation is the superior nation, the player can advance the game advantageously. When the player character's home nation selected by the player is the superior nation, it can be understood from the outward appearance that street performer characters are provided on the area map and the player advances the game more easily. Only the player character whose home nation is the superior nation can obtain useful information from the street performer characters, the player can advance the game advantageously.

The progress of the conquest on the region including the area where the player character exists is sent to the video game apparatus for each period of time which is relatively shorter than progress report processing. By region information check processing, the player can transmit the current dominant nation of each of the regions R1 to R8 and the progress of the conquest to the video game apparatus 100 from the game server apparatus 200 and check-this information when necessary. This makes it possible for the players to easily determine to which area their player characters should be moved to advance the game.

The present invention is not limited to the aforementioned embodiment, and various modifications and applications may be possible. The following explains a modification of the aforementioned embodiment applicable to the present invention.

According to the aforementioned embodiment, the areas A1 to A15 on the world map 400 are included in any of the regions R1 to R8. The points, which are given to the home nation of the player character by the victory of the battle, are totaled for every region. In contrast to this, one area is regarded as one region and points may be totaled. All areas are regarded as one region and points may be totaled. In either case, a change in the content of the game may occur according to the points given to each home nation of the player character.

According to the aforementioned embodiment, in conquest decision processing, the dominant nation of each of the regions R1 to R8 is decided according to the ratio of the obtained points of nations N1 to N3 after the end of the previous conquest decision processing. Instead of the fact that the dominant nation is thus decided by the obtained points for a fixed period of time, the obtained points for each nation up to the present time since the start of providing the network game may be reflected in setting of the dominant nation. For example, the value of the ratio of the obtained points up to the previous time and the value of the ratio of the obtained points this time are totaled in proportions of 2:8, and the dominant nation of each of the regions R1 to R8 may be decided according to the totaled value.

According to the aforementioned embodiment, as the tasks of each player character in the progress of the game, the battles with the enemy character(s) are set. The points are given to the home nation of each player character by wining this battle. However, the tasks to be provided to each player character are not limited to the battle with the enemy character(s). Namely, the tasks to be provided to the player character may be a mini-game such as a puzzle, etc. and a search for a specific item hidden on the map within a limited time. It can be assumed that the group of player characters are formed in a party to clear these tasks.

According to the aforementioned embodiment, the dominant nation of each of the regions R1 to R8 is set by conquest decision processing that is performed every predetermined period of time in contrast to this, when the points are given to the home nation by the player characters' victory in the battle with the enemy character(s), the change in the points may be reflected in real time to change the dominant nation of each of the regions R1 to R8.

According to the aforementioned embodiment, in the case where the nations N1 to N3 are the superior nations, respectively, the street performer characters that provide information to each player character whose home nation is the corresponding nation are arranged on the area map. Moreover, the kinds of items that are sold at the item shop and the prices are changed with respect to the player character whose home nation is the corresponding nation. In the case where the nations N1 to N3 are the dominant nations of the regions R1 to R8, respectively, the spell of the crystal buff is cast on the player character, which belongs to the corresponding nation, in the dominated region. Moreover, the player character can purchase the item at the item shop of the corresponding region.

However, the content of the game can be changed according to the method other than the above methods. For example, the player character belonging to the superior nation or dominant nation may use a hotel, which can recover a parameter consumed by the battle and the like, at a low charge. Various kinds of statuses of the player character, which belongs to the superior nation or dominant nation, may be changed (for example, improve offensive power and defense power). The player character may speedily move on the world map 400 using a specific vehicle. A building placed on the area map of the nation as a superior nation may be changed.

According to the aforementioned embodiment, in the case where the nations N1 to N3 are the dominant nations of the regions R1 to R8 and the superior nations in the world, respectively, the content of the game is changed from the default state such that the player character belonging to the corresponding nation can advance the game advantageously. However, the advantageous or disadvantageous points to the progress of the game resulting from the fact that the nations N1 to N3 become the dominant nations or superior nations may be relatively changed. For example, the content of the game may be changed such that the player character whose home nation is a nation that cannot dominate any one of the regions R1 to R8 advances the game disadvantageously as compared with the default state.

According to the aforementioned embodiment, the home nation of the player character is selected by the player at the initial log-in time for logging in the network game from the video game apparatus 100, and cannot be changed afterward. In contrast to this, each player may change the home nation of his/her player character at an arbitrary timing or designated timing such that the content of the game can be more dramatically changed.

In this case, if the player instructs a change in the home nation of the player character from the input section 161, information on the changed home nation is sent to the game server apparatus 200 from the video game apparatus 100. Upon the receipt of this information, the control section 203 of the game server apparatus 200 changes the home nation registered in the player character table 400. The control section 203 can subtract the points from the previous home nation, which the player character caused the previous home nation to obtain after the previous conquest decision (assuming that the obtained points are totaled for each player character and the result is registered in the player character table 420 in the battle end processing).

According to the aforementioned embodiment, the player can arbitrarily select the nation to which the player character belongs. For this reason, there is a possibility that many player characters will concentrate in a specific nation depending on the case. In this case, the nation where many player characters concentrate will inevitably dominate many regions if the aforementioned processing continues.

For this reason, for example, the control section 203 can divide the obtained points of each nation by the number of belonging player characters in conquest decision processing, and a point ratio between nations can be obtained according to this division result. This can be similarly applied to the case that the superiority or inferiority of each nation is determined in progress report processing or region information check processing. The smaller the number of player characters belonging to the nation that dominates the region, the higher the degree of advantage for the progress of the game can be increased. Such a modification eliminates the occurrence of unbalance of whether he progress of the game becomes advantageous or disadvantageous by a difference in the home nation of the player character.

According to the aforementioned embodiment, the program and data of the video game apparatus 100 are stored in the storage medium 131 and distributed. The program and data of the game server apparatus 200 are stored in the storage medium 231 and distributed. In contrast to these, these programs and data may be stored to a fixed disk device that a Web server apparatus existing on the network 151 has. In accordance with a request from the video game apparatus 100 or the game server apparatus 200, the Web server apparatus may convert program data stored in the fixed disk device to a signal, and may superimpose the signal on a carrier wave to distribute to the video game apparatus 100 or the game server apparatus 200 via the network 151.

In the video game apparatus 100, the program and data, which the communications interface 115 has received from the Web server, can be stored in the HDD 107 and loaded on the RAM 105 at an executing time. In the game server apparatus 200, the program and data, which the communications interface 117 has received, can be stored in the HDD 207 and loaded on the RAM 205 at an executing time.

Although the invention has been described with reference to several exemplary embodiments, it is understood that the words that have been used are words of description and illustration, rather than words of limitation. Changes may be made within the purview of appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A network game system having a server apparatus and a plurality of client apparatuses each connected to the server apparatus via a network, each of the client apparatuses comprising:

a group selector that selects a group to which a player character operated in a virtual space based on a player's operation belongs, the virtual space being divided into a plurality of zones;

a group information transmitter that transmits group information on the group selected by the group selector to the server apparatus via the network;

an operation instructing device that instructs an operation of the player character in the virtual space based on a player's operation;

an operation transmitter that transmits the operation to the server apparatus via the network;

a change information receiver that receives change information indicating a change in a content of a game sent from the server apparatus; and a display controller that causes a display device to display the content of the game indicated by the change information, the server apparatus comprising:

a group information receiver that receives the group information transmitted from the group information transmitter;

a group register that registers groups to which each player character of the plurality of client apparatuses belongs based on the received group information;

an operation receiver that receives the operation of the player character transmitted from the operation transmitter;

a point calculator that calculates points corresponding to a degree of achievement of a task of each player character based on the received operation of the player character;

a point totaler that, every fixed periodic judgment interval, which is independent from tasks assigned to player characters, totals the points calculated by the point calculator for each of the zones for each group to which each player character belongs;

a game changer that changes the content of the game in a next fixed periodic judgment interval, which is independent from tasks assigned to player characters, based on the points totaled for each zone and for each group in a current fixed periodic judgment interval, which is independent from tasks assigned to player characters;

a change information transmitter that transmits change information on the content of the game changed by the game changer to each of the plurality of client apparatuses via the network;

a dominion provider that provides dominion of each zone to a dominating group having a greatest number of total points for the zone, wherein the game changer changes the content of the game according to whether dominion of each zone is provided to any one of the groups by the dominion provider so that each player character belonging to the dominating group receives an advantage within each zone dominated by the group of the player character;

a point corrector that corrects the total points of each group in accordance with a number of registered player characters of each group; and a group changer that changes the group of the player characters registered in the group register based on an instruction from the client apparatus corresponding to each player character, wherein the point totaler totals the points of the player character subjected to the group change after excluding the points calculated by the point calculator before changing the group from the total points of each group, and wherein the point calculator calculates a different number of points as the points corresponding to the degree of achievement of the task, depending on whether the player character's group has dominion of the zone where the player character has accomplished the task.

2. A game server apparatus connected to a plurality of client apparatuses via a network, comprising:
a group register that registers groups to which each player character of the plurality of client apparatuses belongs;
a point calculator that calculates points corresponding to a degree of achievement of a task given to each player character operated in a virtual space according to a player's operation at the plurality of client apparatuses, the virtual space being divided into a plurality of zones;
a point totaler that, every fixed periodic judgment interval, which is independent from tasks assigned to player characters, totals the points calculated by the point calculator for each of the zones for each group to which each player character belongs;
a game changer that changes a content of a game in a next fixed periodic judgment interval, which is independent from tasks assigned to player characters, based on the points totaled for each zone and for each group in a current fixed periodic judgment interval, which is independent from tasks assigned to player characters;
a change information transmitter that transmits change information on the content of the game changed by the game changer to each of the plurality of client apparatuses via the network,
a dominion provider that provides dominion of each zone to a dominating group having a number of total points for each zone exceeding a predetermined threshold;
a point corrector that corrects the total points of each group in accordance with a number of registered player characters of each group; and
a group changer that changes the group of the player characters registered in the group register based on an instruction from the client apparatus corresponding to each player character,
wherein the point totaler totals the points of the player character subjected to the group change after excluding the points calculated by the point calculator before changing the group from the total points of each group,
wherein the game changer changes the content of the game according to whether dominion of each zone is provided to any one of the groups by the dominion provider so that each player character belonging to the dominating group receives an advantage within each zone dominated by the group of the player character,
wherein the game changer changes a type of items obtained by the player character and/or a condition required for the player character to obtain the items, based on the total points.

3. The game server apparatus according to claim 2, wherein the game changer changes a feature on an outer appearance in the virtual space based on the total points.

4. The game server apparatus according to claim 2, wherein the game changer changes a content of information that is obtainable by the player based on the total points.

5. The game server apparatus according to claim 2, wherein the game changer changes a status of the player character based on the total points.

6. The game server apparatus according to claim 2, wherein the point calculator calculates a different number of points as the points corresponding to the degree of achievement of the task, depending on whether the dominion of the zone where each player character has accomplished the task is provided to any of the groups.

7. The game server apparatus according to claim 2, further comprising:
a non-achievement ratio calculator that calculates a ratio based on when each player character cannot achieve the task, wherein the dominion provider provides the dominion of each zone to groups except the group to which the player character belongs that cannot achieve the task.

8. The game server apparatus according to claim 2, wherein the game changer changes the content of the game such that the player character, which belongs to a group dominating a greatest number of zones, advances the game advantageously.

9. The game server apparatus according to claim 2, wherein the task given to the player character comprises a battle with an enemy character, and points corresponding to the degree of achievement of the task comprise points corresponding to an experience value given to each player character when each player character wins the battle.

10. The game server apparatus according to claim 9, wherein the experience value given to the player character is calculated according to a level difference between a level of the player character and a level of the enemy character.

11. The game server apparatus according to claim 9, wherein a plurality of player characters operated by a players' operation at different client apparatuses battle with the enemy character, each of the player characters forming a party with one another, and the experience value given to one of the player characters of the party is calculated according to a level difference between a level of the player character and a level of the other player characters.

12. The game server apparatus according to claim 2, wherein the point totaler totals points, which the point calculator has calculated for a predetermined period of time for each group.

13. The game server apparatus according to claim 12, further comprising: a total information transmitter that transmits information, which complies with the total points, to the plurality of video game apparatuses every time the predetermined period of time passes.

14. The game server apparatus according to claim 12, further comprising: a total information transmitter that transmits information, which complies with the total points, to a video game apparatus in accordance with a request from the video game apparatus.

15. A game server apparatus connected to a plurality of client apparatuses via a network the game server apparatus comprising:
a memory that stores a network program;
a processor that executes the network game program;
a communications apparatus that performs communications with the plurality of client apparatuses; and
a point corrector that corrects total points of each group in accordance with a number of registered player characters of each group,
the network game program stored in the memory causing the processor to execute:
preregistering, in the server apparatus, a group to which a player character, selected according to a player's operation at one of the plurality of client apparatuses, belongs;
calculating points corresponding to a degree of achievement of a task, given to each player character operated in a virtual space according to the player's operation at the one of the plurality of client apparatuses, the virtual space being divided into a plurality of zones;
every fixed periodic judgment interval, which is independent from tasks assigned to player characters, totaling the calculated points for each of the zones for each group to which each player character belongs so as to change a content of a game in a next fixed periodic judgment interval, which is independent from tasks assigned to player characters, based on the total points for each zone and for each group in a current fixed periodic judgment interval, which is independent from tasks assigned to player characters;

transmitting change information on the changed content of the game to each of the plurality of client apparatuses via the network; and providing dominion of each zone to a dominating group having a number of total points for each zone exceeding a predetermined threshold; and changing the group of the player characters registered in the preregistered group based on an instruction from the client apparatus corresponding to each player character, wherein the totaling of calculated points comprises totaling the points of the player character subjected to the group change after excluding the points calculated before changing the group from the total points of each group, wherein the content of the game changes according to whether dominion of each zone is provided to any one of the groups so that each player character belonging to the dominating group receives an advantage within each zone dominated by the group of the player character, including receiving a different type of item and/or being subject to different conditions to obtain items.

16. A network game advancing method that is executed by a system in which a server apparatus and a plurality of client apparatus are connected to each other via a network, comprising:

preregistering, in the server apparatus, a group to which a player character selected according to a player's operation at one of the plurality of client apparatuses belongs;

calculating points corresponding to a degree of achievement of a task given to each player character operated in a virtual space according to the player's operation at one of the plurality of client apparatuses, the virtual space being divided into a plurality of zones;

totaling the calculated points for each of the zones for each group to which each player character belongs every fixed periodic judgment interval, which is independent from tasks assigned to player characters;

changing a content of a game in a next fixed periodic judgment interval, which is independent from tasks assigned to player characters, based on the total points for each zone and for each group in a current fixed periodic judgment interval, which is independent from tasks assigned to player characters;

providing dominion of each zone to a dominating group having a number of total points for each zone exceeding a predetermined threshold; and correcting the total points of each group in accordance with a number of registered player characters of each group; and changing the group of the player characters registered in the preregistered group based on an instruction from the client apparatus corresponding to each player character, wherein the totaling of calculated points comprises totaling the points of the player character subjected to the group change after excluding the points calculated before changing the group from the total points of each group, wherein the content of the game changes according to whether dominion of each zone is provided to any one of the groups so that each player character belonging to the dominating group receives an advantage within each zone dominated by the group of the player character, including receiving a different type of item and/or being subject to different conditions to obtain items.

17. A computer-readable storage medium on which a network game program is recorded, the program causing a computer connected to a plurality of client apparatuses via a network to execute:

preregistering, in the server apparatus, a group to which a player character selected according to a player's operation at one of the plurality of client apparatuses belongs;

calculating points according to a degree of achievement of a task given to each player character operated in a virtual space according to the player's operation at one of the plurality of client apparatuses, the virtual space being divided into a plurality of zones;

every fixed periodic judgment interval, which is independent from tasks assigned to player characters, totaling the calculated points for each of the zones for each group to which each player character belongs so as to change a content of a game in a next fixed periodic judgment interval, which is independent from tasks assigned to player characters, based on the total points for each zone and for each group in a current fixed periodic judgment interval, which is independent from tasks assigned to player characters;

transmitting change information on the changed content of the game to each of the plurality of client apparatuses via the network;

providing dominion of each zone to a dominating group having a greatest number of total points for each zone, wherein the content of the game changes according to whether dominion of each zone is provided to any one of the groups so that each player character belonging to the dominating group receives an advantage within each zone dominated by the group of the player character; and correcting the total points of each group in accordance with a number of registered player characters of each group; and changing the group of the player characters registered in the preregistered group based on an instruction from the client apparatus corresponding to each player character, wherein the totaling of calculated points comprises totaling the points of the player character subjected to the group change after excluding the points calculated before changing the group from the total points of each group, wherein the calculating calculates a different number of points as the points corresponding to the degree of achievement of the task, depending on whether the player character's group has dominion of the zone where the player character has accomplished the task.

18. A method for advancing a network game program that is executed by a computer apparatus connected to a plurality of client apparatuses via a network, the method comprising:

preregistering, in the server apparatus, a group to which a player character selected according to a player's operation at one of the plurality of client apparatuses belongs;

calculating points according to a degree of achievement of a task given to each player character operated in a virtual space according to the player's operation at one of the plurality of client apparatus, the virtual space being divided into a plurality of zones;

every fixed periodic judgment interval, which is independent from tasks assigned to player characters, totaling the calculated points for each of the zones for each group to which each player character belongs so as to change a content of a game in a next fixed periodic judgment interval, which is independent from tasks assigned to player characters, based on the total points for each zone and for each group in a current fixed periodic judgment interval, which is independent from tasks assigned to player characters;

transmitting change information on the changed content of the game to each of the plurality of client apparatuses via the network;

providing dominion of each zone to a dominating group having a greatest number of total points for each zone, wherein the content of the game changes according to whether dominion of each zone is provided to any one of the groups so that each player character belonging to the dominating group receives an advantage within each zone dominated by the group of the player character; and correcting the total points of each group in accordance with a number of registered player characters of each group; and changing the group of the player characters registered in the preregistered group based on an instruction from the client apparatus corresponding to each player character, wherein the totaling of calculated points comprises totaling the points of the player character subjected to the group change after excluding the points calculated before changing the group from the total points of each group, wherein the calculating calculates a different number of points as the points corresponding to the degree of achievement of the task, depending on whether the player character's group has dominion of the zone where the player character has accomplished the task.

* * * * *

UNITED STATES PATENT AND TRADEMARK OFFICE
CERTIFICATE OF CORRECTION

PATENT NO. : 7,530,895 B2
APPLICATION NO. : 10/322604
DATED : May 12, 2009
INVENTOR(S) : Yusuke Kigoshi It is certified that error appears in the above-identified patent and that said Letters Patent is hereby corrected as shown below:

On the title page, Abstract (57), line 5, of the printed patent, "When the, player" should be --When the player--.

At Column 23, Line 26 (Claim 2, Line 24) of the printed patent, "network," should be --network;--.

At Column 24, Line 41 (Claim 15, Line 2) of the printed patent, "network" should be --network,--.

Signed and Sealed this

Nineteenth Day of January, 2010

David J. Kappos
*Director of the United States Patent and Trademark Office*